(12) United States Patent
Wang et al.

(10) Patent No.: US 12,253,893 B2
(45) Date of Patent: *Mar. 18, 2025

(54) POWER SUPPLY APPARATUS

(71) Applicant: Delta Electronics, Inc., Taoyuan (TW)

(72) Inventors: Tao Wang, Taoyuan (TW); Min Zhou, Taoyuan (TW); Yuliang Zhang, Taoyuan (TW); Jianhong Zeng, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,364

(22) Filed: Apr. 29, 2022

(65) Prior Publication Data

US 2022/0261054 A1 Aug. 18, 2022

Related U.S. Application Data

(60) Division of application No. 17/105,180, filed on Nov. 25, 2020, now abandoned, which is a continuation-in-part of application No. 15/952,224, filed on Apr. 12, 2018, now Pat. No. 10,877,534, which is a division of application No. 14/840,063, filed on Aug. 31, 2015, now Pat. No. 9,977,476.

(30) Foreign Application Priority Data

Sep. 2, 2014 (CN) .......................... 201410442972.6

(51) Int. Cl.
*G06F 1/26* (2006.01)
*G06F 1/20* (2006.01)

(52) U.S. Cl.
CPC . *G06F 1/26* (2013.01); *G06F 1/20* (2013.01)

(58) Field of Classification Search
CPC ..................................... G06F 1/20; G06F 1/26
See application file for complete search history.

(56) References Cited

U.S. PATENT DOCUMENTS 3,660,726 A 5/1972 Ammon et al.
4,984,059 A 1/1991 Kubota et al.
(Continued)

FOREIGN PATENT DOCUMENTS

CN 1332512 A1 1/2002
CN 1684350 A 10/2005
(Continued)

OTHER PUBLICATIONS

Petitioner's Power of Attorney in Post Grant Proceedings Before the Patent Trial and Appeal Board, Mar. 13, 2024.
(Continued)

*Primary Examiner* — Paul B Yanchus, III
(74) *Attorney, Agent, or Firm* — KIRTON McCONKIE; Evan R. Witt

(57) ABSTRACT

Disclosed herein is a power supply apparatus. The power supply apparatus includes at least one power unit and a magnetic unit. The magnetic unit is stacked with and electrically connected to the at least one power unit. The magnetic unit comprises a plurality of pins and a magnetic core. The at least part of the plurality of pins extends out of a projection of the magnetic core in a connection plane of the at least one power unit and the magnetic unit to connect to the at least one power unit.

25 Claims, 23 Drawing Sheets

(56) References Cited

U.S. PATENT DOCUMENTS

| | | |
|---|---|---|
| 6,496,377 B1 | 12/2002 | Happ et al. |
| 6,621,011 B1 | 9/2003 | Daidai et al. |
| 6,674,272 B2 | 1/2004 | Hwang |
| 6,934,166 B2 | 8/2005 | Vinciarelli |
| 7,068,515 B2 | 6/2006 | Harris et al. |
| 7,361,844 B2 | 4/2008 | Vinciarelli et al. |
| 8,238,789 B2 | 8/2012 | Seorl et al. |
| 8,587,963 B2 | 11/2013 | Nan et al. |
| 9,622,373 B1 | 4/2017 | Sarti |
| 9,977,476 B2 * | 5/2018 | Zeng .................. G06F 1/26 |
| 10,264,664 B1 | 4/2019 | Vinciarelli et al. |
| 10,285,270 B2 | 5/2019 | Fjelstad |
| 10,447,166 B2 | 10/2019 | Zeng et al. |
| 10,877,534 B2 | 12/2020 | Zeng |
| 2002/0131258 A1 | 9/2002 | Inoue et al. |
| 2005/0098874 A1 | 5/2005 | Jun et al. |
| 2005/0189566 A1 | 9/2005 | Matsumoto et al. |
| 2007/0024369 A1 | 2/2007 | Cao |
| 2008/0052551 A1 | 2/2008 | Chapuis et al. |
| 2008/0101025 A1 | 5/2008 | Harris et al. |
| 2008/0158841 A1 | 7/2008 | Inagaki et al. |
| 2008/0231233 A1 | 9/2008 | Thornton |
| 2009/0175014 A1 | 7/2009 | Zeng et al. |
| 2010/0093132 A1 | 4/2010 | Elbanhawy et al. |
| 2010/0105251 A1 | 4/2010 | Hiew et al. |
| 2011/0080102 A1 | 4/2011 | Ge et al. |
| 2011/0157947 A1 | 6/2011 | Lo et al. |
| 2012/0173892 A1 | 7/2012 | Tong et al. |
| 2013/0229841 A1 | 9/2013 | Giuliano |
| 2014/0198454 A1 | 7/2014 | Yuan et al. |
| 2014/0306674 A1 | 10/2014 | Kondou et al. |
| 2014/0355218 A1 | 12/2014 | Vinciarelli et al. |
| 2015/0070940 A1 | 3/2015 | Sato et al. |
| 2015/0116891 A1 | 4/2015 | Park et al. |
| 2015/0245531 A1 | 8/2015 | Meinecke et al. |
| 2016/0013719 A1 | 1/2016 | Babazadeh et al. |
| 2016/0062428 A1 | 3/2016 | Zeng et al. |
| 2016/0156201 A1 | 6/2016 | Park |
| 2016/0160828 A1 | 6/2016 | Betscher et al. |

FOREIGN PATENT DOCUMENTS

| | | |
|---|---|---|
| CN | 101119035 A | 2/2008 |
| CN | 101465743 A | 6/2009 |
| CN | 101651031 A | 2/2010 |
| CN | 101895191 A | 11/2010 |
| CN | 101777844 B | 4/2012 |
| CN | 103107777 A | 5/2013 |
| CN | 103596365 A | 2/2014 |
| CN | 103824853 A | 5/2014 |
| CN | 103872036 A | 6/2014 |
| CN | 104038070 A | 9/2014 |
| CN | 104111715 A | 10/2014 |
| CN | 104253536 A | 12/2014 |
| CN | 104638944 A | 5/2015 |
| CN | 205004324 U | 1/2016 |
| CN | 105449987 A | 3/2016 |
| CN | 105790586 A | 7/2016 |
| CN | 105990265 A | 10/2016 |
| CN | 105990266 A | 10/2016 |
| CN | 106024763 A | 10/2016 |
| CN | 106026350 A | 10/2016 |
| CN | 106373932 A | 2/2017 |
| CN | 107452694 A | 12/2017 |
| CN | 108022899 A | 5/2018 |
| GB | 2399684 A | 9/2004 |
| IN | 103872919 A | 6/2014 |
| JP | 2005235816 A | 9/2005 |
| TW | M253836 U | 12/2004 |
| TW | 200534570 A | 10/2005 |
| TW | 201505345 A | 2/2015 |

OTHER PUBLICATIONS

Petitioner's Notice Ranking and Explaining Material Differences Between Petitions for Inter Partes Review of U.S. Pat. No. 10,877,534, Mar. 25, 2024.

Petition for Inter Partes Review of U.S. Pat. No. 10,877,534 Pursuant To 35 U.S.C. §§ 311-319, 37 C.F.R. § 42, Mar. 25, 2024.

Notice of Filing Date Accorded To Petition and Time for Filing Patent Owner Preliminary Response, Mar. 25, 2024.

Patent Owner's Mandatory Notices, Apr. 15, 2024.

Patent Owner's Power of Attorney.

ERRATA.

Excerpts from Prosecution History of 10,877,534.

Declaration of R. Jacob Baker, Ph.D., P.E.

Complaint for Patent Infringement, Nov. 1, 2023.

First Amended Complaint for Patent Infringement, Jan. 26, 2024.

Design Guide & Applications Manual, VICOR, Dec. 2013.

*Delta Electronics, Inc.* v *Vicor Corporation*, Exhibit B1, Vinciarelli US 2014/0355218, Aug. 19, 2024. Sets forth Vicor Corporation's assertion that certain claims of U.S. Pat. No. 10,877,534 are anticipated by or obvious over U.S. Publication No. 2014/0355218.

*Delta Electronics, Inc.* v *Vicor Corporation*, Exhibit B2, Zeng US 2009/0175014, Aug. 19, 2024. Sets forth Vicor Corporation's assertion that certain claims of U.S. Pat. No. 10,877,534 are anticipated by or obvious over U.S. Publication No. 2009/0175014.

*Delta Electronics, Inc.* v *Vicor Corporation*, Exhibit B3, Park US 2015/0116891, Aug. 19, 2024. Sets forth Vicor Corporation's assertion that certain claims of U.S. Pat. No. 10,877,534 are anticipated by or obvious over U.S. Publication No. 2015/0116891.

*Delta Electronics, Inc.* v *Vicor Corporation*, Exhibit B4, Jun US 2005/0098874, Aug. 19, 2024. Sets forth Vicor Corporation's assertion that certain claims of U.S. Pat. No. 10,877,534 are anticipated by or obvious over U.S. Publication No. 2005/0098874.

*Delta Electronics, Inc.* v *Vicor Corporation*, Exhibit B5, Vinciarelli U.S. Pat. No. 10,264,664, Aug. 19, 2024. Sets forth Vicor Corporation's assertion that certain claims of U.S. Pat. No. 10,877,534 are anticipated by or obvious over U.S. Pat. No. 10,264,664.

*Delta Electronics, Inc.* v *Vicor Corporation*, Defendant's Initial Invalidity Contentions, Aug. 19, 2024. Sets forth Vicor Corporation's assertion that U.S. Pat. Nos. 8,711,580 and 10,877,534 are invalid.

* cited by examiner

POWER SUPPLY APPARATUS

CROSS-REFERENCE TO RELATED APPLICATION

This application is a divisional application of U.S. application Ser. No. 17/105,180 filed on Nov. 25, 2020 and entitled "POWER SUPPLY APPARATUS". In addition, U.S. application Ser. No. 17/105,180 is a continuation-in-part application of U.S. application Ser. No. 15/952,224 filed on Apr. 12, 2018 and entitled "POWER SUPPLY APPARATUS", which is a divisional application of U.S. application Ser. No. 14/840,063 filed on Aug. 31, 2015 and entitled "POWER SUPPLY APPARATUS". The entire contents of the above-mentioned patent applications are incorporated herein by reference for all purposes.

FIELD OF THE INVENTION

The present invention relates to a power supply apparatus. More particularly, the present invention relates to the internal structure of a power supply apparatus.

BACKGROUND OF THE INVENTION

With people's increased demand to the intelligent life, the society's need to data processing is also growing. The global energy consumption spent on data processing averages thousands or even tens of thousands kilowatt-hour (KWH); and a large scale data center may occupy tens of thousands square meters. Therefore, a greater efficiency and higher power density are the key index for the healthy development of this industry.

The key component of the data center is the server, which has a main board that usually composed of data processing chips such as CPU, chipsets, memory, etc., and the power supply and necessary peripheral components thereof. With the improvement of the processing capability of the server unit volume, the numbers of these chips and the integration level thereof are also increased, which results in the increase of the space occupied and the power consumption. Therefore, the power supply for supplying these chips (also referred to as the main board power supply because it is disposed on the same main board as the data processing chip is) is expected to exhibit greater efficiency, higher power density and more compact volume, so as to realize the energy-saving of the whole server or even the whole data center and reduction of the floor space.

In the server, the main board PCB is configured to transmit the energy and signal. On the main board PCB, a data processing chip and a power supply thereof are disposed. The height of the casing of the server is often a standard value, which is defined using the industrial standard "U"; for example, 1 U, 1.5 U, 2 U, etc. (1 U=1.75 inch=44.45 mm). For example, for a server with a height of 1 U (about 40 mm; the actual size of the 1 U device may vary due to the fit tolerance), the main board is a PCB consisting of 6 to 50 layers, which is very expensive to manufacture. In the case where the height of the server casing is limited, in order to ensure the expected efficiency, by reducing the area that the main board power supply occupies on the main board (that is, the horizontal area of the main board power supply), it is possible to reduce the over volume, increase the power density, and accordingly, lower the manufacturing cost. In the present disclosure, the power of the power supply unit horizontal area is referred to as the "power pressure".

When using the same technology level in designing a power supply having a power of Po, the greater the volume (V) of the power supply, the easier to achieve a higher efficiency; that is, the power efficiency is positively proportional to the volume (V). The volume (V) equals to the product of the height (H) and the horizontal area (S). The power pressure (Pp) equals to Po/S. If the efficiency is fixed at a specific level (meaning the efficiency is kept the same), the following relationship between the power pressure (Pp) and the height (H) could be derived: the greater the H, the greater the Pp. In other words, to improve Pp, we should focus on the utilization of the height (H) for a solution. Of course, if the goal is to pursue the efficiency, the height should be properly utilized based on the foregoing rationale. Therefore, how to utilize the height is the key to address both the power pressure (Pp) and the efficiency.

The thickness or height of the main board power supply can be as thin as 7 mm or even less; hence, when the height of the server is limited to, say 1 U, there are more than 20 mm of space height above the power. In this case, the efficiency can be 90% or higher, since the power consumption thereof is only a fraction (such as 10%) of the data processing chip, in fact, it is possible for it to handle the heat dissipation issue without using a heat dissipation unit. In this way, the space above the main board power supply is not adequately utilized.

Generally, there two ways to manufacture the main board power supply. The first one uses a PCB as the bearer on which individual components are installed. After years of efforts, this type of main board power supply achieves satisfactory efficiency and power density. Yet, since the components are individually installed, there should be necessary space or safety distance between components, thereby limiting the further size reduction of the horizontal area; also, the uneven height would affect the subsequent handling of the heat.

The other way to manufacture the main board power supply is to use certain packaging technique to integrate each components of the power supply into a quite regular element. By using such packaging techniques, the power density is significantly increased with satisfactory efficiency; also, such regular shape is advantageous for the subsequent handling of the heat; thereby providing an appropriate solution. However, said packaging technique realize the volume reduction and power density improvement by lowering the height of the main board power supply, and hence, it focuses on decreasing the height based on the original horizontal area. Therefore, this solution is only one of the solutions for pursuing a better power density; however, it cannot adequately address the improvement regarding the power pressure of the main board power supply.

Therefore, there is a need of providing an improved power supply apparatus in order to achieve better performance. Good and stable conduction performance is achieved through leading components and it also benefits to achieve the high efficiency and the high power density.

SUMMARY OF THE INVENTION

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

The present invention addresses the deficiency of the prior art and provides a novel solution that deals with both the power pressure and the efficiency; it is suitable for use in application settings requiring a larger horizontal area; such as the demand for power supply in data processing settings like the data center.

In one embodiment, a power supply apparatus includes a bearing plate, insulation material and a plurality of pins. The insulation material is formed on two opposite surfaces of the bearing plate. The plurality of pins are electrically connected to the bearing plate and allocated along lateral sides of the insulation material.

In one embodiment, a power supply apparatus includes a bearing plate, insulation material and at least one pin. The insulation material is formed on two opposite surfaces of the bearing plate. The at least one pin is electrically connected to the bearing plate and contacting at least part of the insulation material.

In view of the foregoing, the technical solutions of the present disclosure result in significant advantageous and beneficial effects, compared with existing techniques. The implementation of the above-mentioned technical solutions achieves substantial technical improvements and provides utility that is widely applicable in the industry. The present disclosure provides a stack structure so that the height of the power supply can be properly utilize; when the volume is fixed, it is possible to achieve a smaller floor space; meanwhile, it retains sufficient volume to ensure a higher efficiency, thereby addressing both the high power pressure and high efficiency. Also, it supports the data processing apparatus with better performances.

Many of the attendant features will be more readily appreciated, as the same becomes better understood by reference to the following detailed description considered in connection with the accompanying drawings.

The present disclosure provides a power module and a manufacturing method thereof. By optimizing the leading components on the side edges of the substrate to provide good conduction performance, the power module can achieve stable conduction, thereby meeting the requirement of high power density and avoiding the loss or breaking of leading wire on the side edges of substrate at the same time. It further improves the competitiveness of the power module. In addition, by prefabricating at least two leading components into a one-piece leading unit, it is advantageous to integrate and simplify the manufacturing process of the power module and the purposes of enhancing structural stability and reducing manufacturing costs are achieved at the same time.

In accordance with an aspect of the present disclosure, there is provided a power module. The power module includes a substrate, a power device, a leading component and at least one molding component. The substrate includes a first side, a second side and a conductive wire. The first side and the second side are opposite to each other. The power device is disposed on the substrate. The power device is electrically connected with the conductive wire. The leading component is disposed on the substrate and includes a first horizontal portion and a vertical portion connected with each other. The vertical portion is electrically connected with the conductive wire of the substrate. The leading component includes a first contact surface and a second contact surface, and the first contact surface and the second contact surface are non-coplanar. The molding component is disposed on the substrate and covers at least portion of the substrate and at least portion of the leading component. The first contact surface and the second contact surface of the leading component are uncovered by the molding component. The power module includes a first surface and a first lateral side. The first contact surface of the leading component is located at the first surface of the power module and the second contact surface of the leading component is located at the first lateral side of the power module.

In accordance with another aspect of the present disclosure, there is provided a manufacturing method of a power module. The manufacturing method includes steps of (a) providing a substrate panel, wherein the substrate panel includes a plurality of substrates and the plurality of substrates are arranged in an array, wherein each substrate includes a first side, a second side and a conductive wire, and the first side and the second side are opposite to each other, wherein the plurality of substrates includes a first substrate and a second substrate; (b) providing at least one leading unit and a plurality of power devices disposed on the substrate panel, wherein the plurality of power devices are disposed on and corresponding to the plurality of substrates, and each power device is electrically connected with the conductive wire of the corresponding substrate, wherein the at least one leading unit includes at least two of a first leading component and a second leading component connected adjacent to each other, and the first leading component and the second leading component both include a first horizontal portion and a vertical portion, wherein the first horizontal portions of the first leading component and the second leading component are electrically connected to the conductive wires of the adjacent two of the first substrate and the second substrate through the corresponding vertical portions, respectively; (c) forming a molding layer disposed on the substrate panel to cover at least portion of the first leading component and at least portion of the second leading component; and (d) separating the substrate panel, the at least one leading unit and the molding layer, wherein the molding layer is separated into a plurality of molding components, and the first leading component and the second leading component are separated.

In accordance with a further aspect of the present disclosure, there is provided a power module. The power module includes a substrate, a power device, a leading component and at least one molding component. The substrate includes a first side, a second side and a conductive wire. The first side and the second side are opposite to each other. The power device is disposed on the substrate. The power device is electrically connected with the conductive wire. The leading component is disposed on the substrate and includes a first horizontal portion and a vertical portion connected with each other. The vertical portion is electrically connected with the conductive wire of the substrate. The leading component includes a first contact surface and a second contact surface and the first contact surface and the second contact surface are non-coplanar. The molding component is disposed on the substrate and covers at least portion of the substrate and at least portion of the leading component. The first contact surface and the second contact surface of the leading component are uncovered by the molding component.

The above contents of the present disclosure will become more readily apparent to those ordinarily skilled in the art after reviewing the following detailed description and accompanying drawings, in which:

BRIEF DESCRIPTION OF THE DRAWINGS

The present description will be better understood from the following detailed description read in light of the accompanying drawing, wherein.

DETAILED DESCRIPTION OF THE PREFERRED EMBODIMENT

Figure 1:
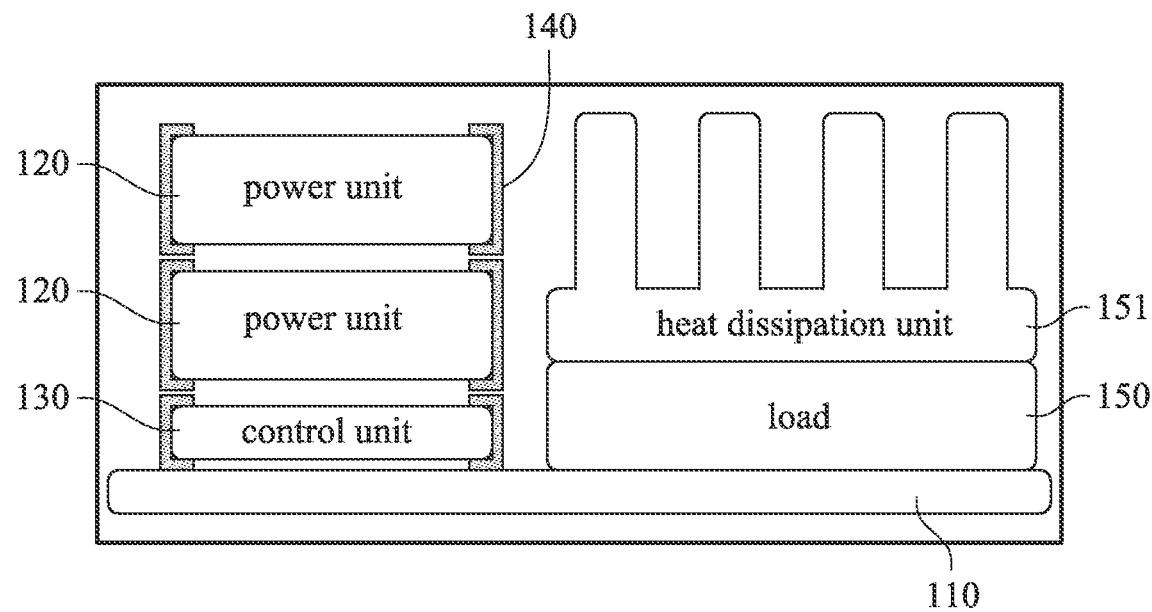
FIG. 1 is a lateral view illustrating a power supply apparatus according to one embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

In the following detailed description, for purposes of explanation, numerous specific details are set forth in order to attain a thorough understanding of the disclosed embodiments. In accordance with common practice, like reference numerals and designations in the various drawings are used to indicate like elements/parts. Moreover, well-known elements or method steps are schematically shown or omitted in order to simplify the drawing and to avoid unnecessary limitation to the claimed invention.

In the detailed description and appended claims, the term "coupled with" applies generally to that one component is indirectly connected to another component via other component(s), or one component is directly connected to another component without any other component.

On technical aspect of the present invention is a power supply apparatus, which can be used in a server or more generally in various technical fields. It should be noted that the power supply apparatus according to this aspect uses the stack structure, and therefore, the height of the power supply can be properly utilized so that a smaller floor space can be realized when the volume is fixed.

FIG. 1 is a lateral view illustrating a power supply apparatus according to one embodiment of the present disclosure. As illustrated in FIG. 1, the power supply application device (e.g., a power supply apparatus) comprises a main board 110, a power unit 120, a control unit 130, and a pin 140. The main board 110 further has a load 150 disposed thereon; the power unit 120 is disposed on the main board 110; the control unit 130 and the power unit 120 are stacked on the main board 110 at a position in adjacent to the load 150; the pin 140 is electrically coupled to the main board 110, the control unit 130, and the power unit 120; in the present embodiment, there are multiple pins 140 and these pins are respectfully disposed on a lateral side of each of the power unit 120 and the control unit 130; the two power units 120 and the control unit 130 are stacked with one another on the main board 110. The control unit 130 is configured to control the power unit 120; specifically, the control unit controls the two power units 120 via the pins 140, so that the power unit 120 supplies the electricity to the adjacent load 150. The load 150 is a digital processing IC, such as a central processing unit (CPU), and the CPU has a heat dissipation unit/heat dissipation device such as a heat dissipation element 151 disposed thereon. The power unit 120 comprises at least one power semiconductor device (such as, switch tubes S21, S22, S23, S24 in FIG. 3, switch tubes S21, S22, S23, S24, S31, S32, S33 in FIG. 11); the control unit 130 comprises at least one chip having the control or driving ability (such as, the control circuit 310 in FIG. 3, the control circuit 1100 in FIG. 11, DSP).

In one embodiment, the power supply apparatus is disposed on the main board 110; the main board 110 further has a load 150 of a data processing chip (such as, CPU) disposed thereon; the power supply apparatus comprises: the power unit 120, the control unit 130 and pins 140. The control unit 130 and the power unit 120 are stacked on the main board at a position in adjacent to the load 150; the pins are electrically coupled to the main board 110, the control unit 130 and the power unit 120; the control unit 130 is configured to control the power unit 120, so that the power unit 120 supplies the electricity to the adjacent load 150.

In sum, the DC/DC power supply comprises at least two units (i.e., modules): the control unit 130 and the power unit 120. Said two modules are vertically stacked, and the electric connection therebetween is realized via the conductors (i.e., pins 140) so as to transmit the electric signal. The power unit 120 comprises at least one active switching element; the power unit 120 receives the input power and generates a corresponding output power by the conduction and turning-off of the active switching element and then supplies the output power to the load 150, such as the data processing chip. The control unit module 130 comprises at least one control chip for sending a control signal to the active switching element of the power unit 120 so as to control the conduction and turning-off of said element. The unit disposed at the upper position and a portion of the pins are fixed by the unit disposed at the lower position, and then transmits the electric signal to the above-mentioned main board 110 (such as, the PCB).

In this way, due to the stack structure adopted herein, the height of the power supply can be more properly utilized so as to realize a smaller floor space at a given volume; while retaining sufficient volume to ensure a higher efficiency; accordingly, it accomplishes both the high power pressure and high efficiency. Also, it supports the data processing apparatus with better performances.

Infrastructure and Distribution of Stack Component of the Power Supply

Figure 2:
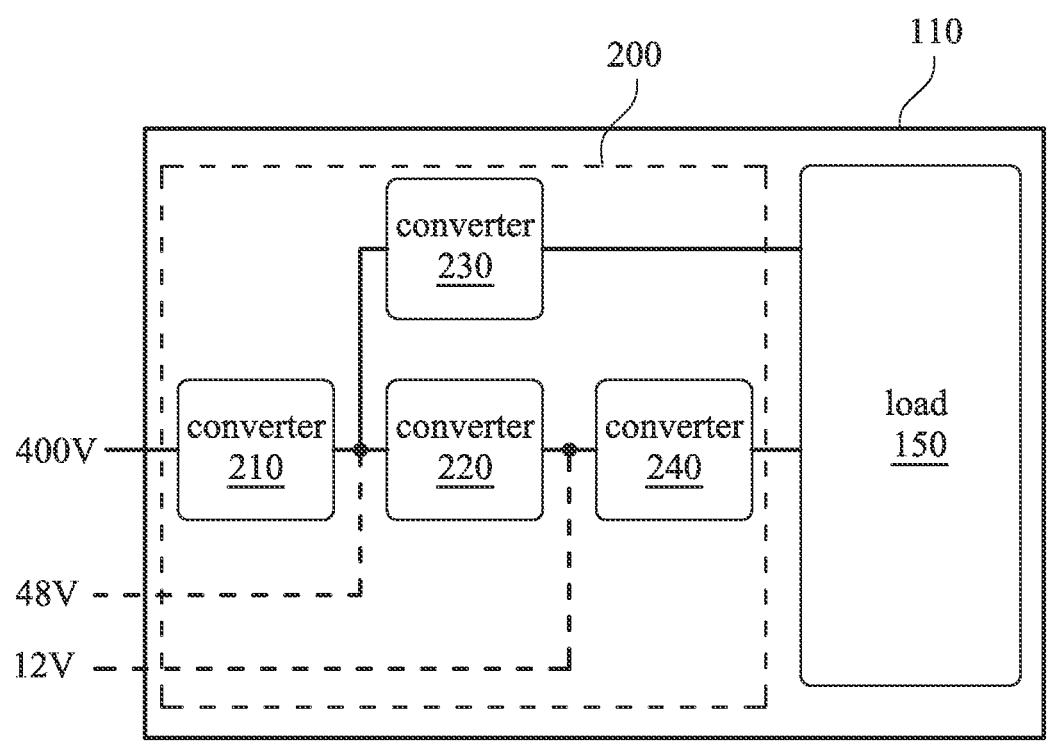
FIG. 2 to FIG. 14 illustrate the infrastructure and distribution of stack component of the power supply according to embodiments of the present disclosure.

FIG. 2 is a schematic diagram illustrating various types of power supply converter (i.e., the main board power supply 200) that may involve in a server main board. The input of the power supply converter is often a direct current with a wide range of voltage, including high voltage of 200 to 500 V (for example, 400 V), middle voltage of 18 to 72 V (for example, 48 V) and low voltage of 5 to 15 V (for example, 12 V). No matter what kind of voltage is being inputted, a corresponding DC/DC converter is required to convert the input into a desired output to be supplied to the load 150, such as the data processing chip, like a central processing unit (CPU) and memory. The variation range of the output is also wide so as to adapt to the demands of various loads; for example, the output can be as low as 0.8 V or even lower, or as high as 12 V or even higher. When the load 150 is a CPU and memory, the output voltage is often in the range of 0.8 to 2 V. Therefore, the power supply specification involved includes, mainly:

(1) Converter 210 converts 400 V to 48 V: the input voltage is in a range of 200 to 500 V (for example, 400 V) which is outputted as a stable output voltage or at a fixed ratio to the input voltage; for example, the output voltage can be around 48 V or a voltage un the range of 18 V to 72 V. Since the output voltage is higher, it will not be directly connected to the data processing chip load; instead, another specification converter should be cascaded thereafter to adjust the voltage to a level that can be used by the load.

(2) Another a converter (not shown in the drawing) coverts 400 V to 12 V: the input voltage is in a range of 200 to 500 V (for example, 400 V) which is outputted as a stable output voltage or at a fixed ratio to the input voltage; for example, the output voltage can be around 12 V. Since the output voltage is lower, it can be connected to some data processing loads, such as a hard drive. However, when the load voltage is even lower; for example, 0.5 to 5 V, another specification DC/DC converter should be cascaded thereafter to adjust the voltage to a level that can be used by the load.

(3) Yet another converter (not shown in the drawing) converts 400 V to 0.5 to 5 V: the input voltage is in a range of 200 to 500 V (for example, 400 V) which is outputted as a stable output voltage depending on the actual need; for example, the output voltage is in the range of 0.5 to 5 V. The output voltage can be directly connected to the data processing chip, such as the CPU, memory, etc.

The converts according to the above-mentioned specification (1) to (3) use a high-voltage input, and hence, they should meet the requirements for high voltage safety insulation, and the insulation voltage should be around a DC voltage of 2000 V, or even higher.

(4) Converter 220 converts 48 V to 12 V: the input voltage is in a range of 18 to 72 V (for example, 48 V), which is outputted as a stable output voltage or at a fixed ratio to the input voltage; for example, the output voltage can be around 12 V, or in the range of 3 to 15 V. The converter of this specification can be directly connected to some data processing loads, such as a hard drive.

(5) Converter 230 converts 48 V to 0.5 to 5 V: the input voltage is in a range of 18 to 72 V (for example, 48 V) which is outputted as a stable output voltage depending on the actual need; for example, the output voltage is in the range of 0.5 to 5 V. The output voltage can be directly connected to the data processing chip, such as the CPU, memory, etc.

(6) Converter 240 converts 12 V to 0.5 to 5 V: the input voltage is in a range of 3 V to 15 V (for example, 12 V) which is outputted as a stable output voltage depending on the actual need; for example, the output voltage is in the range of 0.5 to 5 V. The output voltage can be directly connected to the data processing chip, such as the CPU, memory, etc. Since this converter uses the low-voltage input, there is no need for insulation, and the output can be directly connected to the data processing chip, such as the CPU, memory, etc.

The converts according to the above-mentioned specification (4) to (6) use a low-voltage input, and hence, the voltage-bearing demand of the converters is lower, which is generally less than a DC voltage of 2000 V.

When the output of the converter is 0.5 to 5 V, since the output can be directly connected to the load 150, such as the data processing chip, the power supply converter is required to output a low-voltage high current, and a high dynamic responsive ability is required, for example, when the load 150 is a CPU, a responsive ability of 1000 A/ns is required; and in this case, the power supply converter should be disposed in adjacent to the load. Therefore, such power supplies are referred to as the "point of the load". Among them, the power supply for supplying the CPU (also known as the voltage regulated module (VRM)) is required to supply the electricity from an adjacent position.

The power supply converters having the above-mentioned input/output specifications are all disposed on the main board; hence, they can be stacked to achieve the goals of high power pressure and high efficiency. Of course, the combination of various converters is also appropriate for the stack arrangement.

As described above, the power supply having an input of 400 V or 48V often requires an input/output safety pressure tolerance due to the greater pressure difference between the input and output, and it often uses a transformer to isolate and transmit the energy. Of course, if necessary, for example, to realize a wider input or output range, a low-voltage input power supply (such as a power supply having an input of 12 V) can also use a transformer to transmit the energy.

The converters according to the above-mentioned specifications can employ various type of topology to achieve the conversion of the electric energy, for example, the pulse-width modulation (PWM)-based forward circuit, full-bridge circuit, phase-shift full-bridge circuit, half-bridge circuit, fly-back circuit, etc. To realize a higher power density, a higher operation frequency is often required, for example, 500 kHZ, 1 MHZ, or even more than 2 MHZ. To achieve a high efficiency under such high frequency, a resonant circuit (that is, a pulse-frequency modulation (PFM)-type LLC series resonant converter (LLC-SRC), parallel resonant converter (PRC), etc.) is often selected.

Figure 3:
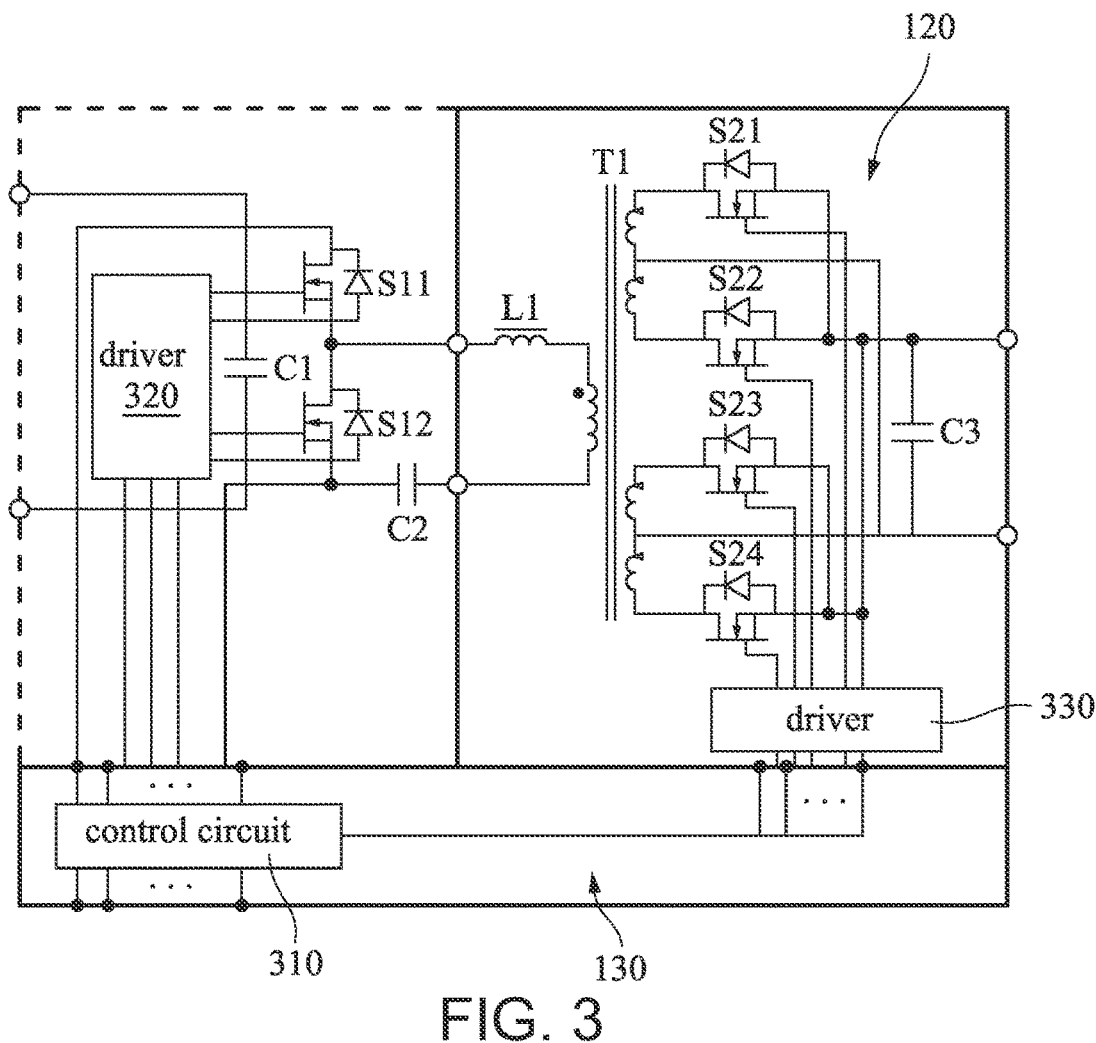

FIG. 3 illustrates a half-bridge LLC circuit. As illustrated in FIG. 3, the circuit comprises a main circuit and a control circuit 310. The main circuit comprises: an input capacitor C1, a resonant capacitor C2, a resonant inductor L1, a transformer T1, primary side switch tubes S11, S12 and secondary side switch tubes S21, S22, S23, S24, wherein the input capacitor C1 is connected with the primary side switch tubes S11, S12; the primary side switch tubes S11, S12 is connected with a series circuit composed of the resonant capacitor C2, the resonant inductor L1, the primary winding of the transformer T1; the secondary winding of the transformer T1 is connected with the secondary side switch tubes S21, S22, S23, S24; the output capacitor C3 is connected with the secondary side switch tubes S21, S22, S23, S24. The primary side switch tubes S11, S12 receive the input power and convert the DC input signal into a AC signal; the AC signal is transmitted to the secondary side via the resonant inductor L1, the resonant capacitor C2 and the transformer T1, and then passed through the secondary side synchronous rectifying circuit (such as, the secondary side switch tubes S21, S22, S23, S24), and generates an output voltage on the output capacitor C3 and supplies the output power to the load. It should be noted that since the output is a low-voltage high current, to reduce the loss, the elements with low-voltage high current (such as the T1 secondary winding, the secondary rectifier, the output capacitor) are often in parallel connection to obtain a low resistance. For example, "an assembly of a rectifying assembly S21, S22 and a secondary winding" and "an assembly of another rectifying assembly S23, S24 and another secondary winding" are in parallel connection. Since the output voltage may vary, the structure of the transformer secondary winding is not limited to the central tap rectifying structure illustrated in FIG. 3; rather, it could be any other structure such as the full-bridge rectifying structure.

The control circuit 310 generates a control signal that is supplied to the driver 320 for driving the primary side switch tubes S11, S12, and the driver 330 for driving the secondary side switch tubes S21 to S24, so as to control the conduction or turning-off of each switch element (e.g., switch tubes S11, S12, S21 to S24) in the main circuit. Of course, the control circuit 310 may further comprise other elements necessary for sampling, protection and communication; these elements or not illustrated in the drawing, and hence will not be discussed in detail herein.

Since the power unit 120 is under the high-frequency operating status, and the output of the converter is a low-voltage high current, generally, the circuit composed of the secondary side of the transformer, the output synchronous rectifying circuit and the output capacitor should be as small as possible so as to adapt for the need of the high frequency. Therefore, the transformer T1, the synchronous rectifying circuit (i.e., secondary side switch tubes S21, S22), the output capacitor C3 have to be disposed in a single unit circuit (i.e., the power unit 120).

In one embodiment, the maximum operating voltage of the power supply input is greater than 20 V, the power unit 120 comprises: at least one transformer T1, in which the transformer T1 comprises at least one primary side and at least one secondary side; at least one synchronous rectifying assembly (such as, the secondary side switch tubes S21, S22) and an output capacitor assembly (such as, the output capacitor C3). The high frequency energy id delivered from the primary side to the secondary side, and rectified by the synchronous rectifying assembly into a direct current, which is then transmitted to the output capacitor for integration.

On the other hand, the peripheral of the control circuit 310 often comprises many peripheral circuits, and the signal required to be processed is low, and hence, they should be placed in proximity to increase the anti-interference ability. Therefore, the control circuit 310 and the peripheral circuits thereof should be placed in a single unit circuit (i.e., the control unit 130). In one embodiment, the control unit 130 is implemented by an embedding technique and the thickness thereof is less than 2 mm. The power unit (e.g., power supply converting circuit) is a resonant circuit with an operating frequency greater than 1 MHZ. The control unit (e.g., control power supply) has an input filter stacked thereabove.

Regarding the driver 320, 330, the primary side switch tubes S11 to S12, the resonant capacitor C2, and the resonant inductor L1 can be disposed in the power unit 120 or the control unit 130 depending on the actual needs. The input capacitor C1 can inhibit the voltage peak of the primary side switch tubes S11 to S12, and accordingly, it should be preferably disposed with the primary side switch tubes S11, S12 in a single unit. The L1/C2 can be obtained by integrating with other elements such as the T1. Moreover, the T1 exciter inductor can be an individual inductor that in parallel connection with the transformer primary, so as to facilitate the optimization of the performance of the T1.

As illustrated in FIG. 1, the overall power circuit is formed by stacking the control unit 130 and the power unit 120, which will effectively reduce the horizontal area of the power circuit 120; and hence, when the power circuit is placed on the main board 110, the space that it occupies on the main board 110 is reduced. In FIG. 1, the control unit 130 or the power unit 120 can be manufactured by a packaging technique, e.g., using a plastic material in a molding process, so as to form a module. Alternatively, the two units can be manufactured as individual elements. Either way, each unit may comprise a bearing plate, such as, the printed circuit board (PCB) or the direct bonding circuit (DBC), etc., for bearing the components of the unit; alternatively, the components can be directly stacked within the unit, for example, the switch element and elements such as the inductor and the capacitor can be directly stacked with one another. When the primary side switch tubes S11 to S12, the resonant capacitor C2, the resonant inductor L1 are integrated in the power unit, the circuit in the control unit mainly handles the control signal, and hence, the height of the control unit can be very small, such as less than 5 mm, 3 mm, or even 1 mm.

Figure 4:
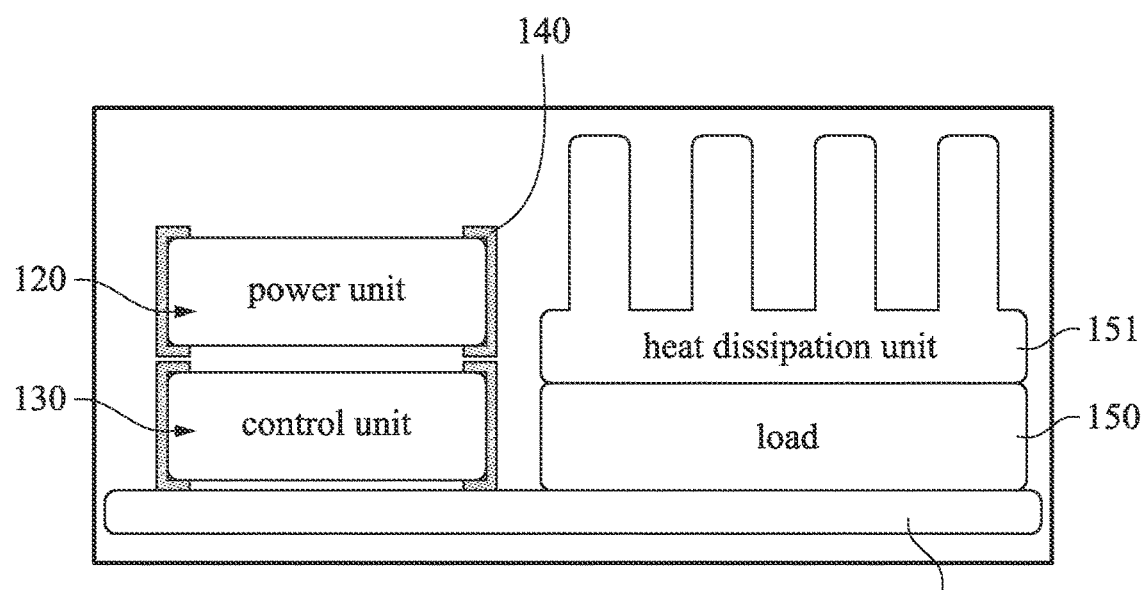

In the case where the size of the power is bigger, it is possible to connect several main circuits illustrated in FIG. 3 using the parallel connection of the input/output. In this way, the overall structure of the power supply apparatus can use one main circuit as a power unit, and stacks several identical power units and a control unit, as illustrated in FIG. 1. The control unit 130 can be disposed at the lower position with two power units 120 stacking thereon, or the control unit can be sandwiched between two power units, or the control unit can be placed above the two power units. Either way, the structure takes full advantage of the height so as to achieve the goal of increasing the power without changing the floor space. In this embodiment, the number of the control unit 130 can be one, and it is configured to control the conduction and turning-off of the switch elements of the two power units 120; or there can be multiple control units, for example, two, for respectively controlling the conduction and turning-off of the switch elements of the two power units. Of course, it is possible to integrate the control unit and one of the power units, so that at least one power unit 120 and one control unit 130 are stacked together, in which the control unit is integrated from at least one main circuit. As illustrated in FIG. 4. The power supply module comprises the power unit 120 and the control unit 130 that are stacked together and are electrically connected via the pins 140. In this embodiment, the power unit 120 is integrated from a DC/DC converter, and the control unit 130 is integrated from another DC/DC converter and a control circuit, in which the control circuit controls said two DC/DC converter.

As discussed above, the power supply apparatus receives an input, generates an output and provides the energy to the load. The power supply apparatus may use the single-stage converter, such as the circuit illustrated in FIG. 3, to achieve the requirement for voltage conversion, or even isolation. Of course, multiple-stage converter can be used. Due to the limitation of the characteristics of the component, usually, the single-stage circuit is not suitable for wide-range input/ output; hence, for a load with a wide voltage range, such as the CPU, memory and other loads applied in the server power supply, it is more appropriate to use a two-stage power supply; in this case, one of the which is responsible for isolation, while another one is responsible for voltage adjustment; each responsible for its own function so as to achieve the optimal performance. For example, structure like this is illustrated in FIG. 5 or FIG. 6.

Figure 5:
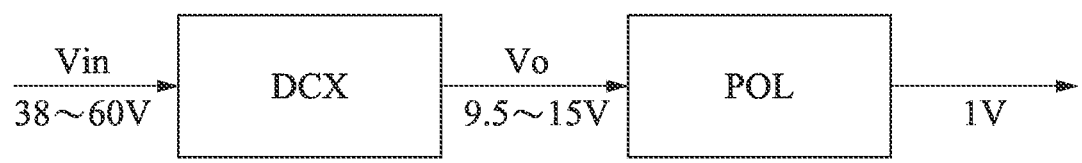
Figure 6:
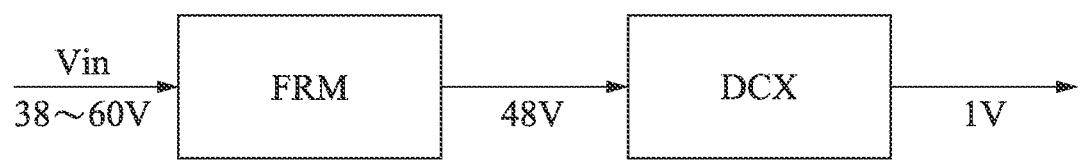

As illustrated in FIG. 5, the input voltage Vin is a wide voltage range, such as 38 to 60 V, the input voltage uses a front-stage circuit (such as an isolated non-regulated DC/DC converter; i.e., an isolated transforming module DCX; as used herein, the term "non-regulated" means that the input/output of a circuit in the operating range is fixed at a constant ratio; that is, the output varies in proportion to the input, such as Vin/Vo=n; for example, in FIG. 5, Vin/Vo=4) to achieve high-voltage isolation; and then uses a post-stage circuit (such as a non-isolated regulated DC/DC converter) to provide the output to the load. For example, the post-stage circuit could be a point-of-load (POL) converting unit that could be used to fulfill the needs for outputting stabilized voltage and dynamic response. Since the post-stage circuit has the adjusting capability, and therefore, the front-stage circuit doesn't need to have the adjusting capability. However, if needed the front-stage circuit may have the full or partial adjusting capability; for example, the front-stage circuit can be an isolated DC/DC converter.

Referring to both FIG. 1 and FIG. 5, the two power units 120 can respectively be a power unit of the primary DC/DC converter and the power unit of the secondary DC/DC converter; the control unit 130 comprises the control unit of the primary DC/DC converter and the control unit of the secondary DC/DC converter. Specifically, the primary DC/DC converter is an isolated DC/DC converter; secondary DC/DC converter is a non-isolated regulated DC/DC converter (such as the one illustrated in FIG. 5), the non-isolated regulated DC/DC converter is closer to the main board 110 than the isolated DC/DC converter is. Alternatively, the primary DC/DC converter is a non-isolated regulated DC/DC converter; the secondary DC/DC converter is an isolated non-regulated DC/DC converter. For example, the primary DC/DC converter is a buck-boost circuit.

In one embodiment, the power unit 120 is a primary DC/DC converter; the control unit 130 is a power unit of a secondary DC/DC converter. For example, the primary DC/DC converter is a non-isolated regulated converter; the secondary DC/DC converter is a non-regulated isolated converter; or, the primary DC/DC converter is an isolated converter; the secondary DC/DC converter is a non-isolated regulated converter.

Since the front-stage circuit is a non-regulated isolated transforming module DCX, it is possible to design it so that the circuit operates at the optimal operating point, thereby making the circuit relatively simple with a high efficiency. When the isolated transforming module DCX is a resonant circuit, the isolated transforming module DCX may operate around the resonant frequency; and when the DC transformer DCX is a PWM circuit, such as a full-bridge circuit, it can operate under the condition with the greatest mark-space ratio. The post-stage circuit is a regulated circuit, such as a point-of-load (POL) DC converter which is usually implemented by a buck circuit (such as, POL buck DC converter), so that the characteristics of the output fulfills the requirement of the load; in this case, the circuit is simple, and the output voltage range is quite wide. Combining the two, it will be easy to achieve the requirements of wide input/output voltage range, high output voltage accuracy, and dynamic response property. When the isolated transforming module DCX uses the resonant circuit, such as the LLC-SRC circuit, it is easier to achieve a power supply with high efficiency and high power density under high frequency. Of course, since the post-stage circuit has the regulation capability, if the DCX reduces the voltage-withstand value of the intermediate BUS capacitor and associated power component, due to certain reason, such as the reduction of the intermediate BUS voltage range, so that the DCX has certain level of output voltage regulation capability, it will not affect the implementation and function of the present invention.

As illustrated in FIG. 6, the input voltage Vin is a wide voltage range, such as 38 to 60 V. The input voltage Vin uses a front-stage circuit (such as a non-isolated regulated DC converter; i.e., a front regulate module (FRM)) to convert the input voltage into a desired value, such as a constant voltage of 48V, and to respond to the dynamic change of the load; and an isolated non-regulated DC converter (i.e., an isolated transforming module DCX) is connected thereafter in parallel connection to achieve the voltage isolation, and the requirement for bucking. Under this structure, the stabilized voltage and dynamic response of the final output (i.e., the output of the post-stage circuit) are implemented by the front-stage circuit. Since the front regulate module (FRM) does not require isolation, it could be implemented with various topologies, such as, buck, boost or buck-boost circuit; for high frequency application, it is possible to implement the soft switching technique. Therefore, the front regulate module (FRM) may have a very high power density, and so does the isolated transforming module DCX.

Referring to both FIG. 1 and FIG. 6, one power unit 120 of the two power units 120 comprises the power unit of the primary DC/DC converter and the power unit of the secondary DC/DC converter; the primary DC/DC converter is an isolated non-regulated DC/DC converter, while the secondary DC/DC converter is a non-isolated regulated DC converter (as illustrated in FIG. 6).

Figure 7:
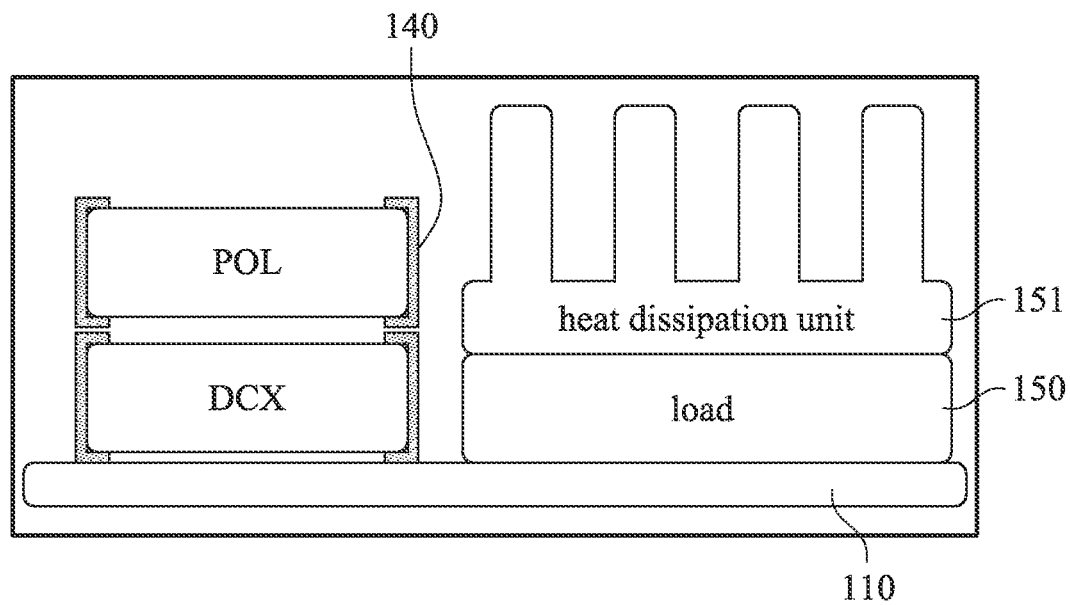
Figure 8:
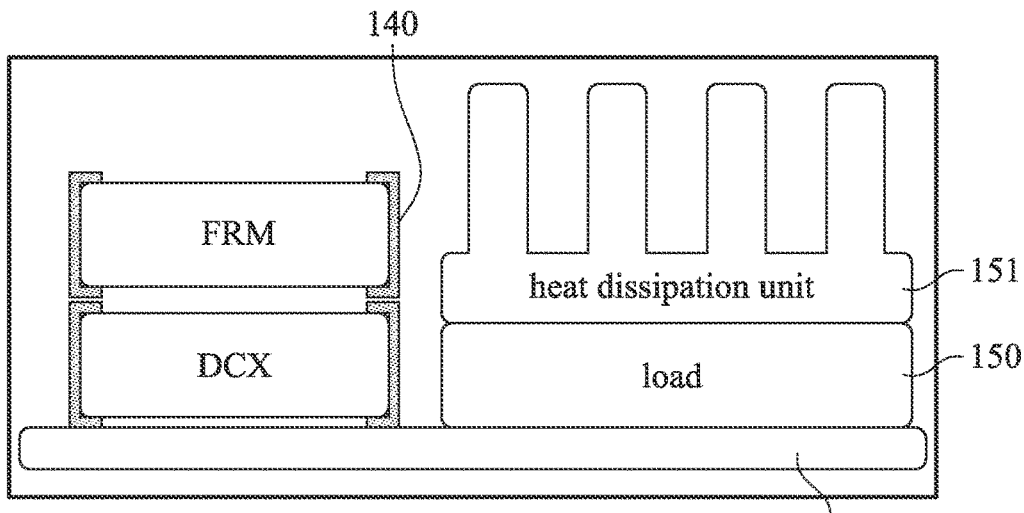

Using the above-discussed two power supply structures, take main board power supply with the output power of 200 W as an example, it is possible to implement the isolated transforming module DCX and point-of-load (POL) DC converter (the structure of FIG. 5) or the front regulate module (FRM) and isolated transforming module DCX (the structure of FIG. 6) within a floor space of ¹⁄₁₆ brick (1.3 in×0.9 in, or 33 mm×22.9 mm); therefore, the power pressure is 85.5 W/inch$^2$ (in fact, due to the installation space required between two units, the power pressure is even lower). Since the height of the two units is less than 10 mm or even 7 mm, if the two units are stacked according to the method provided by the present disclosure (as illustrated in FIG. 7), the control unit and the power unit are integrated as an isolated transforming module DCX which is stacked with the point-of-load (POL) DC converter on the main board 110; or, as illustrated in FIG. 8, the control unit and the power unit are integrated as a front regulate module (FRM) which is stacked with an isolated transforming module DCX on the main board 110. In this way, the power pressure can be immediately doubled to 171 W/inch2, thereby greatly reducing the required space on the main board. Even though the stacking may require some additional height for reasons such as heat dissipation, the overall height thereof can be less than 25 mm, which fully complies with the requirement for the height of the server (which could be as high as 30 mm).

Figure 9:
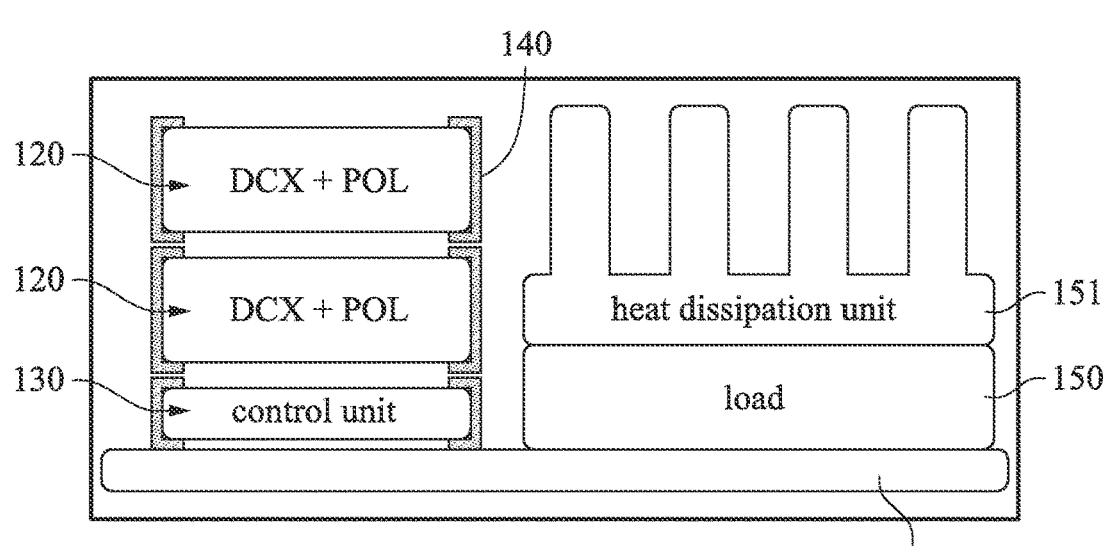

To reduce the volume occupied by the pins for interconnection, the power stages of the above-mentioned isolated transforming module DCX and point-of-load (POL) DC converter can be manufactured in a single power unit 120, and the control circuits of two stages are manufactured in a single control unit 130. In this way, the handle of the power parts can be centralized, so as to achieve a better efficiency and smaller floor space. Depending on actual needs, said power unit part, can be one parts or multiple parts in parallel connection, as illustrated in FIG. 9; multiple power units 120 are in parallel connection and each comprises the power stages of an isolated transforming module DCX and point-of-load (POL) DC converter, the control unit 130 comprises the control circuits of the isolated transforming module DCX and point-of-load (POL) DC converter.

Figure 11:
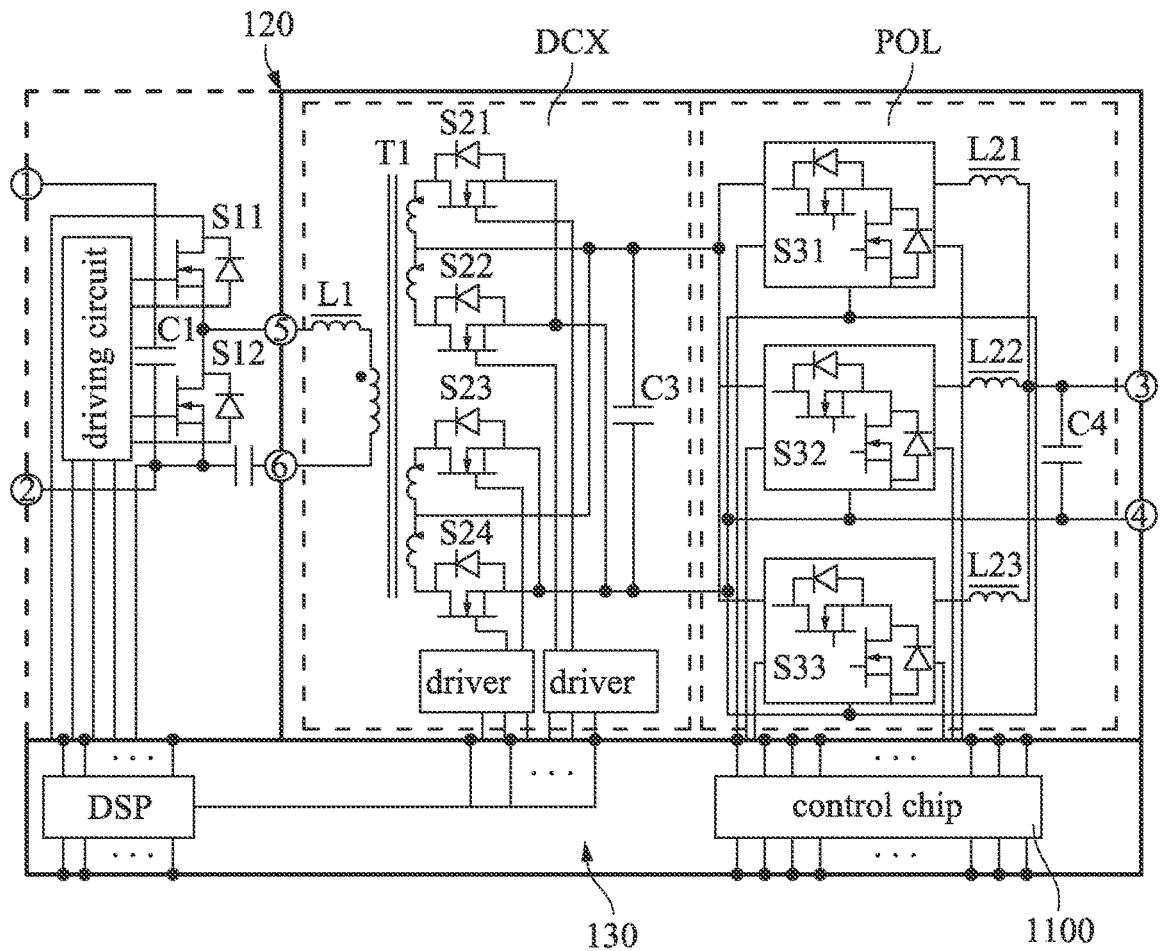

FIG. 11 illustrates the principle of the circuit structure of FIG. 5. FIG. 11 differs from FIG. 3 in that it has an additional post-stage circuit—the circuit of the circuit point-of-load (POL) DC converter, such as the buck circuit illustrated in FIG. 11, in addition to the parts illustrated FIG. 3. Since the output is a low-voltage high current, the POL is usually implemented using several buck circuits in parallel connection. The specific number of the circuits in parallel connection depends on the actual condition. For example, in FIG. 11, there buck circuits are in parallel connection. The isolated non-regulated DC/DC converter comprises: an isolated transformer T1, a plurality of primary switch tube S11, S12 and a plurality of secondary switch tubes S21, S22; the non-isolated regulated DC converter is a point-of-load (POL) DC converter. The circuit of each point-of-load (POL) DC converter respectively comprises the switch tubes S31, S32 and S33 and filtering inductors L21, L22 and L23 and connected with the switch circuits, which form the corresponding buck circuit. The output of the circuit in each point-of-load (POL) DC converter is in parallel connection with the two terminals of the capacitor C4, so as to generate the output power and provided the same to the load. The control chip 1100 is configured to generate the control signal for controlling the conduction and turning-off of the switch elements in the point-of-load (POL) DC converter. To achieve a high efficiency, the power unit 120 comprises the isolated transformer T1, the synchronous rectifying switch tubes S21 to S24, and the output capacitor C3 of the isolated transforming module DCX, and the switch tubes S31 to S33 of the point-of-load (POL) DC converter. In other words, the isolated transformer T1, the secondary switch tubes S21, S22, S23, S24, the output capacitor C3 for isolating the DC/DC converter, and the point-of-load (POL) DC converter are disposed within a single power unit 120. Of course, the structure in FIG. 11 further comprises the filtering inductors L21 to L23 and the output capacitor C4. The control unit 130 comprises a control chip 1100 and the peripheral circuit thereof, such as the signal processor DSP illustrated in FIG. 11 and the peripheral circuit of the controller (not shown). The primary switch tubes S11, S12 are disposed in the control unit 130, and the control unit 130 further comprises the primary switch tube driving circuit, the control driving circuit of the POL DC converter, and the control chip 1100.

Figure 10:
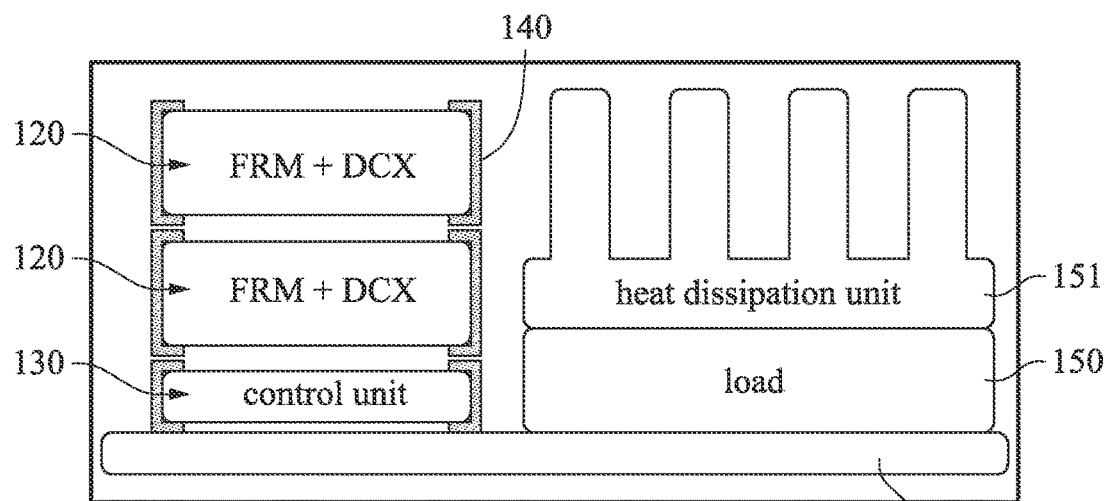

The structure for the front regulate module (FRM) and isolated transforming module DCX can also be implemented in this way, so as to achieve both the higher efficiency and higher power pressure; as illustrated in FIG. 10, multiple power units 120 are in parallel connection, and each of which comprises the power stages of the front regulate module (FRM) and the isolated transforming module DCX; the control unit 130 comprises the control circuits of the front regulate module (FRM) and the isolated transforming module DCX.

Of course, the above-mentioned isolated transforming module DCX can also be a regulated converter or semi-regulated converter. The variation in function will not affect its contribution to the improvement of the efficiency and the power pressure.

Figure 12:
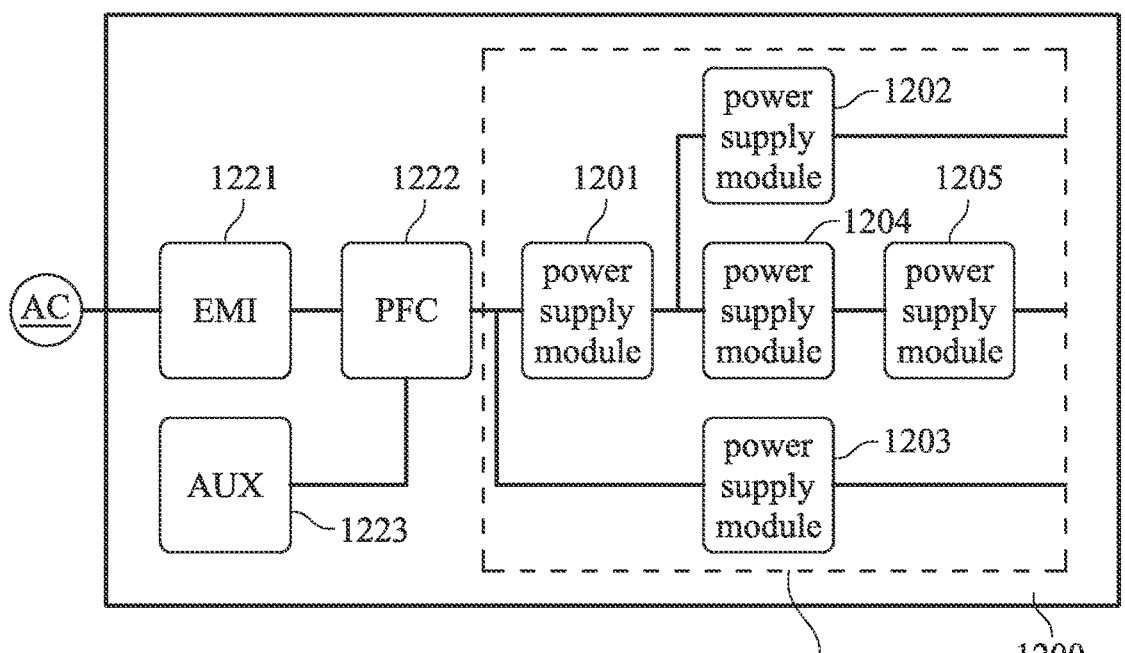

In the above embodiments, all of the power supplies use the DC to DC (DC/DC) converter. These embodiments can be applied in structures such as where the DC power supply directly inputs to the server main board. Of course, with the advancement of the technology, there might be the case where the AC power supply AC directly inputs to the server main board 1200. As illustrated in FIG. 12, the AC power supply AC (such as 220 Vin) directly connects to the server main board 1200, and provides the input power to the corresponding load through the main board power supply 1210 composed of cascaded or parallel-connected power supply modules 1201 to 1205. In comparison to the above-mentioned main board power supply of the DC input, this structure further comprises front-stage cascaded electromagnetic interference (EMI) filter 1221, the power factor correction (PFC) circuit 1222 and the auxiliary power module 1223, etc. In this structure, the above-mentioned stacking techniques can also be used.

Figure 13:
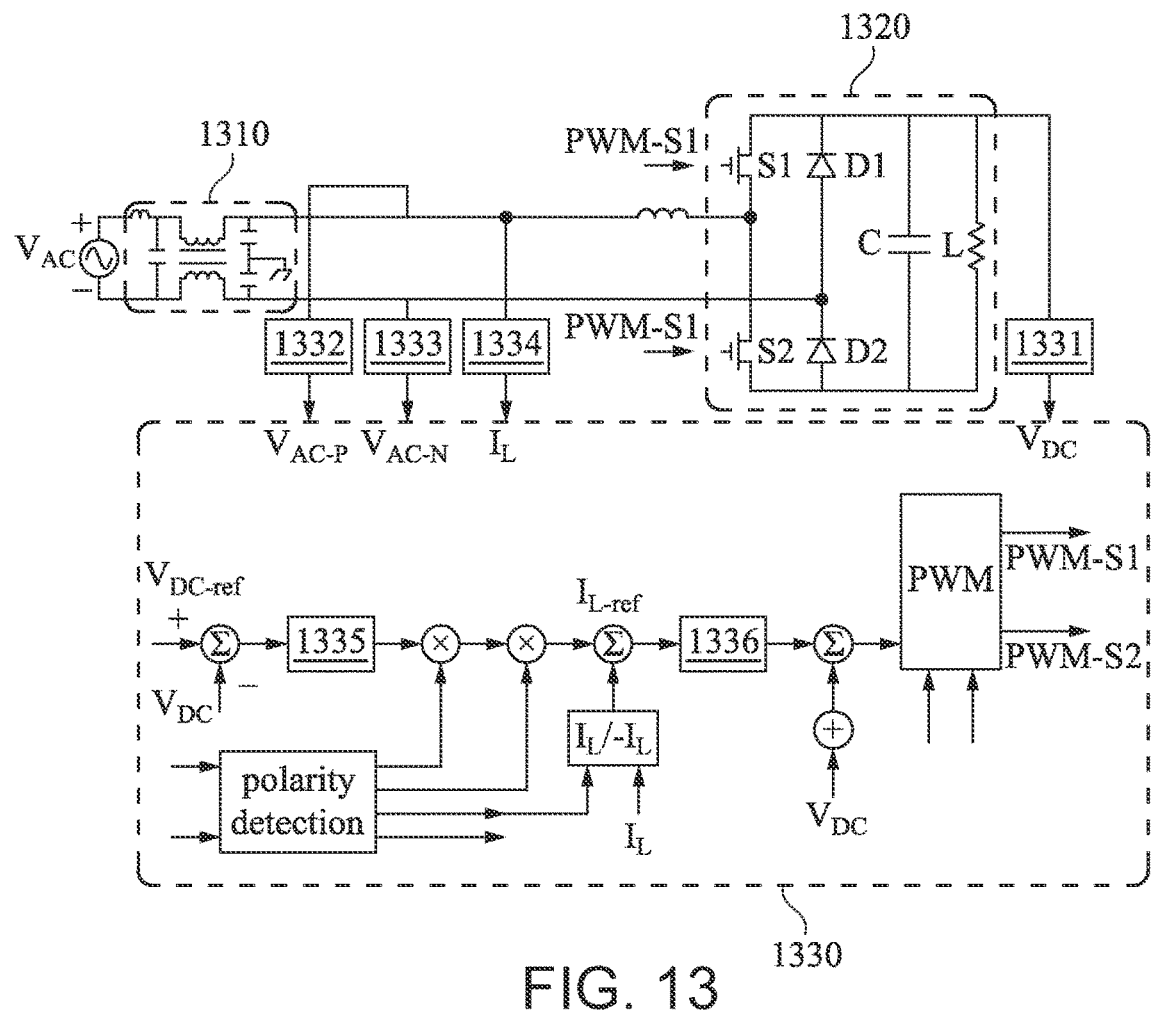

FIG. 13 is a schematic diagram illustrating an EMI filter 1310 cascaded with a post-stage PFC circuit 1320. As illustrated in FIG. 13, after the EMI filter 1310 receives the AC input, e.g., VAC=220 V, it provides an output signal to the post-stage cascaded PFC circuit for power factor correction. In practice, the PFC circuit 1320 can be implemented in various topologies, such as the boost, buck, dual-boost and the totem pole structure illustrated in FIG. 13. Take the totem pole PFC circuit illustrated in FIG. 13 as an example, the main circuit in the PFC circuit 1320 comprises a high frequency capacitor C, a PFC inductor L and power switch devices (that is, a first bridge-arm composed of serially connected active switching elements S1, S2, and a second bridge-arm composed of serially connected passive switch elements D1, D2). The first and second bridge-arms and the high frequency capacitor C are in parallel connection; the power switch devices and the high frequency capacitor C are electrically coupled to the PFC inductor L; two middle points of the two bridge-arms are respectively connected with the output of the EMI filter 1310 or are connected with the output of the filter via the input inductor. The corresponding driving and control circuit 1330 of the PFC is configured to control the power switch devices; specifically, the corresponding driving and control circuit 1330 of the PFC comprises an output sampling voltage divider 1331 that is configured to sample the output VDC of the PFC main circuit; input sampling voltage dividers 1332, 1333, 1334 are configured to sample the input voltage VAC-P and VAC-N, and a sampling circuit for sampling the input current IL. After being compared with the corresponding reference signal VDC-ref, the output signal VDC of the output voltage sampling voltage divider 1335 is outputted by a voltage loop controller 1335 as a signal, which is calculated with the VAC to obtain a reference signal IL-ref of the input current IL; after the input current IL is calculated and compared with the IL-ref, it passes a current loop controller 1336 to obtain a corresponding control signal PWM-S1 and PWM-S2 for controlling the switches S1 and S2.

Figure 14:
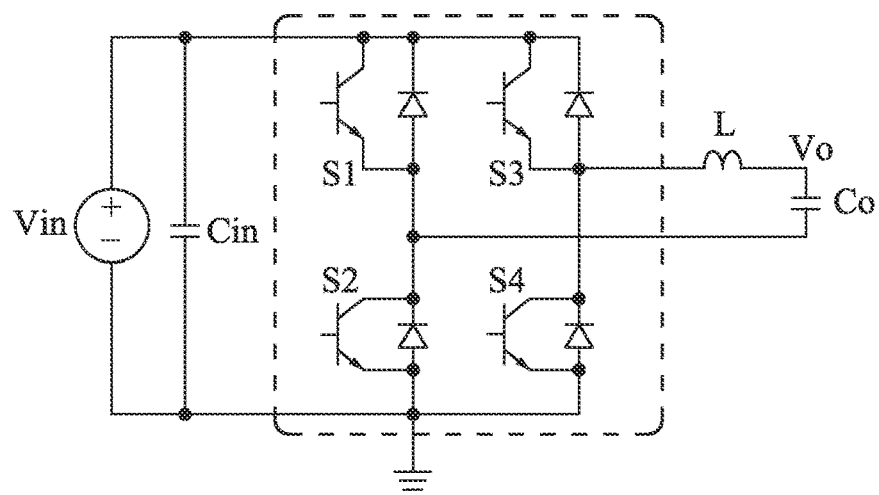

The present disclosure is also suitable to be used in the DC/AC setting, such as the inverter. FIG. 14 illustrates a power unit 120 comprising an inverter circuit; the DC input Vin passes a first bridge-arm composed of serially-connected active switching elements S1, S2 and a second bridge-arm composed of serially-connected active switching elements S3, S4 to give an AC signal; the signal passes a filtering circuit (comprising a filtering inductor L and an output capacitor Co) and then generates an output voltage Vo on the output capacitor Co. The specific control and driving circuit is not shown herein. Such inverter can also adopt a stacking structure that is similar to those described above regarding the PFC circuit. That is, the control unit is integrated from the first and second bridge-arms, the input capacitor Cin and the control driving circuit of the main circuit, while the power unit is integrated from the output filtering inductor L and the output capacitor Co. Of course, it is also feasible to integrate all elements of the main circuit (i.e., the output capacitor Cin, the S1 to S4, the filtering inductor L and the output capacitor Co) to form the power unit 120, and integrate the control unit to form the control and driving circuit.

Examples of Control Unit

The main purpose of the control unit is signal processing, and the height of most components thereof is smaller; hence, to improve the overall utilization percentage of the space, it is possible to use the thinness of the elements comprised in the unit as an evaluation index.

Figure 15:
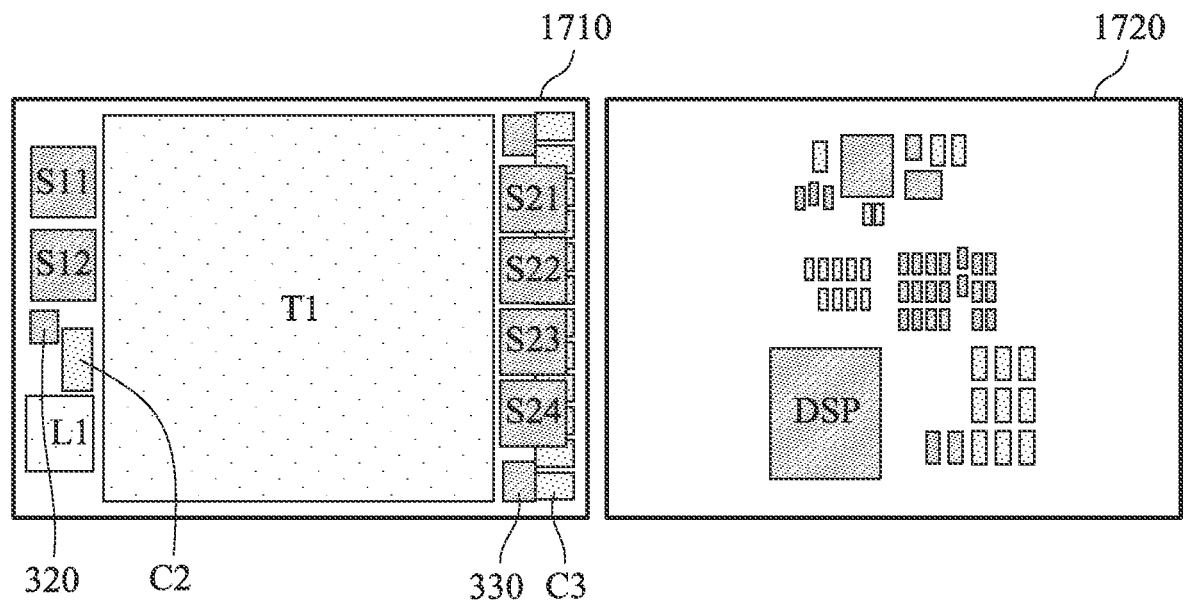
FIG. 15 to FIG. 16 illustrate the embodiments covered by the control unit and the power unit according to embodiments of the present disclosure.
Figure 16:
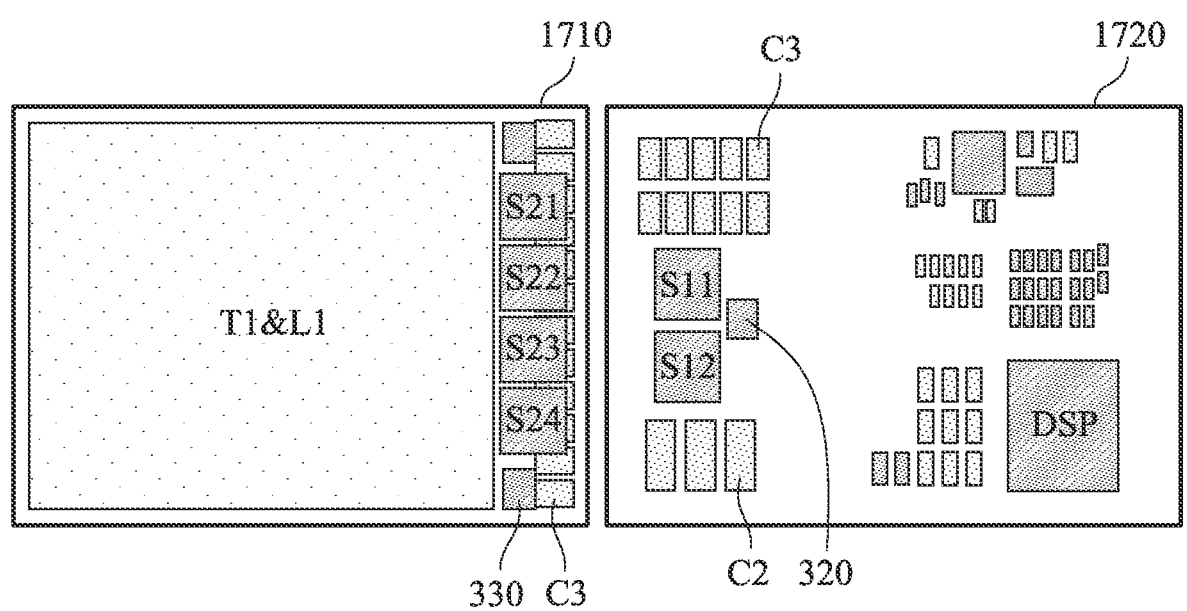

As discussed hereinabove, the controller (under certain specific application, the driving circuit can be viewed as part of the controller) responsible for sending the signal to the driving circuit or switch devices and elements necessary to the peripheral circuit thereof (such as the resistor, capacitor, etc.) must be comprised in the control unit. However, with the improvement of the integration level of the control chip, after these components/elements are disposed, there might be certain space left thereon. Accordingly, it is possible to add more components/elements in the control unit. Take FIG. 3 as an example; if all the power components are disposed in the power unit 120, the layout of these components is illustrated in FIG. 15. In FIG. 15, the left-hand side illustrates the layout of the components/elements of the power unit 120, and the right-hand side illustrates the layout of the components/elements of the control unit 130. In FIG. 15, the square box indicates the bearing plates 1710, 1720 on which the components/elements are placed; as to the components/elements disposed on the bearing plate 1710, 1720, those illustrated in the left-hand side correspond to components/elements illustrated in FIG. 3. As illustrated in FIG. 15, if the area of the power unit 120 and the area of the control unit 130 are the same (that is, the areas of the bearing plates 1710, 1720 of the two units are the same), apparently, the utilization percentage of the control unit 130 is low. To increase the utilization percentage of the area of each unit, it is feasible to move some components/elements from the power unit to the control unit 130; as illustrated in FIG. 16, the primary switch tube S11, S12 is disposed at a position in adjacent to the lateral side of the control unit (i.e., they are disposed on the bearing plate 1720 of the control unit 130. In addition to the thinness, the standard for selecting the components/elements to be moved also includes whether it will affect the electric characteristics and whether it will achieve better functions.

The primary side switch tubes S11, S12 at the high-voltage input side are semiconductors, as such, the thickness thereof is similar to or even thinner than the control chip, and hence, they could be placed in the control unit. For example, when the switch tubes S11 and S12 at the primary side are MOSFETs, if they are placed in the power unit, as illustrated in FIG. 3, there are more than 4 pins (the gate electrode and source electrode for each switch) for the interconnection of the power unit 120 and control unit 130; if they are placed in the control unit 130, there is only two pins for the interconnection of the control unit 130 and the power unit, such as the connection point of the switch tubes S11 and S12 at the primary side and the source electrode of the switch tube S12, as illustrated in FIG. 11. Moreover, since the high-voltage input side is not particularly sensitive to the distribution parameter of the circuits, the effect to the electric characteristics resulted from moving them to the control unit 130 is within the acceptable range. Of course, if the switch tubes S11 and S12 at the primary side are moved, the input capacitor C1 and the driving circuit thereof should also be moved to the control unit 130. Putting these elements in close proximity will not only reduce the voltage peak of the switch tubes S11 and S12 at the primary side, but also reduce unnecessary pins in the power unit.

FIG. 16 is a schematic diagram illustrating an embodiment where some of the switch devices are disposed in the control unit 130. The control unit 130 comprises an input capacitor C1, the resonant capacitor C2 and the primary side switch tubes S11, S12; the power unit 120 comprises a plurality of switch devices and a bearing plate 1710 for bearing the switch devices (such as, S11, S12), as well as an insulation material 3430 (illustrated in FIG. 25) for encapsulating the switch devices; the switch devices are distributed at a position along the pads 3440 (illustrated in FIG. 25). The power unit 120 comprises a transformer T1, a resonant inductor L1, an output capacitor C3 and secondary side switch tubes S21, S22, S23, S24. As could be seen, the utilization percentage of the left-hand side of the control unit 130 is significantly increased, while the inductor (i.e., the resonant inductor L1), the capacitor (i.e., the output capacitor C3) and switch devices (i.e., secondary side switch tubes S21, S22, S23, S24) are disposed at a position on the bearing plate 1710 in adjacent to the lateral side of the power unit. On the left-hand side of the power unit 120, more space is left for the magnetic element, which is significant to the increase of the efficiency. Accordingly, embodiments of the present disclosure may take care of both the high efficiency and high power pressure. It should be noted that since the switch tubes S11, S12 are not disposed in the power unit 120, the input of the power unit 120 comes from the control unit 130, and is a high frequency AC power signal modulated by the switch tubes S11, S12; for example the frequency of the signal is about 500 KHZ or even higher than 3 MHZ, and the value may be less than 12 V to more than 400 V.

If, in certain applications, the positions of the secondary side switch tubes S21, S22, S23, S24 are not sensitive to the electric characteristics, it is also possible to dispose the secondary side switch tubes S21, S22, S23, S24, the driver 330 and the output capacitor C3, as well as the Oring MOS in the control unit 130 so as to further increase the space utilization percentage.

Regarding the stacking structure illustrated in FIG. 10, if the control unit 130 is disposed at the lower position, the control unit 130 will be sandwiched between the power unit 120 and the main board 110; then the pins from the output terminal of the power unit 120 to the main board become longer, which might affect its ability to response to the variation of load, in particularly in cases where the load is a data processing chip like the CPU. In this case, it is possible to dispose part of the output capacitor C3 (or the corresponding POL output capacitor C4 illustrated in FIG. 11) of the main circuit in the control unit 130; in this case, the control unit 130 comprises the output capacitor C3, thereby reducing the effect resulted from the length of the pins. Of course, to do this, it is a requisite that there is a good connection between part of the output capacitor C3 and pins 140.

Figure 25:
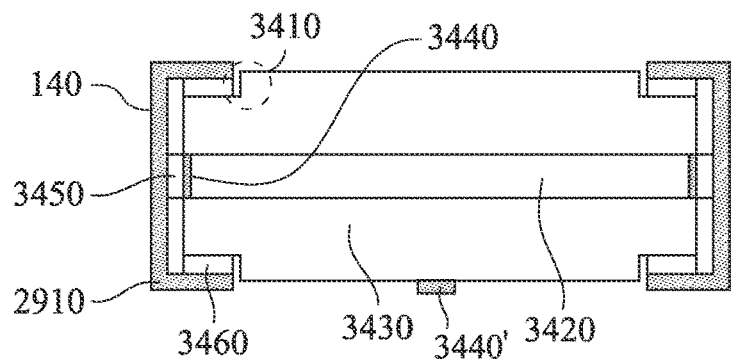

In the above-mentioned embodiments, the control unit 130 comprises a bearing plate, such as the printed circuit board or the lead frame, etc. Of course, the whole control unit 130 can be implemented by an embedding technique. The control unit 130 can also use inter-stacking elements within the unit, so that the surface conductors of the elements are used for electric connection. Using the embedding technique, some electric elements, such as the control IC, the resistor, the capacitor and even the power semiconductor are embedded in the bearing plate. In this way, the control unit is very thin and the area thereof is very small; also, a more delicate circuit wiring at the internal and surface of the unit can be achieved. By using the embedding techniques, one can easily achieve the interconnection between the upper and lower surfaces without limited by the position; that is, it can directly use the corresponding pins without using the pins injected from the lateral side, which is illustrated in FIG. 25. For example, a circuit comprising a transformer and a synchronous rectifier, such as a bridge resonant circuit, can be used to implement a control unit using the embedding technique then, the control unit is stacked with a power module comprising the transformer and synchronous rectifier, and the resultant circuit is characterized in that: the power unit comprises at least one transformer (Core and Winding), the output synchronous rectifier, part of the output capacitor, the control signal of the SR MOS (generated by the power module or provided by the control unit), so as to achieve a high efficiency of the power stage; the power unit still uses the pins (Pin) injected from the lateral side, the Pin comprises the positive and negative electrodes of the output, and the two electrodes of the high frequency pulse at the input side that has been modulated. The control unit comprises an embedded control logic IC, responsible for sampling, controlling signal and driving the signal generation, protecting, and necessary communication to the outside of the power supply, as well as at least one pair of power elements at the high-voltage side, responsible for generating the input-side high frequency pulse to be transmitted to the power unit; the pins of the control unit can be arranged at the lateral side or passing through the upper or lower surface, depending on the need, or can be arranged to form the connection from the internal position to the surface and arranged at the surface as needed; after the embedding, the control unit is very thin, e.g., about 1 mm; accordingly, the Pins can be mainly the SMD pins, so as to enhance the connection strength of the Pins. By using the embedding technique, one can easily achieve the wiring capability similar to the PCB, so as to implement more complex interconnection at the surface, and support the stacking combination with more content, for example, disposing some necessary elements that is difficult to be embedded in the control unit, e.g., the input EMI filter (i.e., the input capacitor) together with the power unit at the surface of the control unit. This embodiment achieves a very small size, and hence, it is more suitable in high-frequency operating settings, such as the one with an operation frequency of more than 1 MHZ. Hence, the converting circuit is preferably a resonant-type circuit. The thickness of the embedded-type control unit is preferably less than 2 mm.

The control unit 130 can be the assembly of the control circuits according to the above-mentioned examples, can be a control circuit comprising some components/elements of the power circuit, and even the driving circuit; alternatively, it can also be a power supply converter with full function, such as the one as illustrated in FIG. 7. In this way, the control unit and the power unit are stacked together, and connected through pins, as well as connected to the main board through the pins, thereby achieving a structure with two or more inter-stacking power units. Nonetheless, at least one of the power units comprises the components/elements of the control unit. Such structure is often suitable for use in a system infrastructure with multi-stage power unit in parallel connection or cascaded connection.

Examples of Power Unit

In sum, the power unit can be a complete DC/DC or AC/DC power supply converter that can operate on its own, such as, the isolated transforming module DCX, the point-of-load (POL) DC converter, the front regulate module (FRM), the regulated bus converter (RBC), the PFC circuit, the auxiliary power supply module, etc.; that is, one power supply converter that comprises the power stage circuit and the control circuit; alternatively, it could be only the power stage circuit thereof, or even a portion of the power stage circuit such as those described in the above embodiments; said portion can be the part that should be placed in proximity, such as the three key elements illustrated in FIG. 16, that is, the transformer T1, the output rectifying element (e.g., the secondary side switch tubes S21, S22, S23, S24) and the output capacitor C3. The power unit may have the isolation capability of the isolated transforming module DCX, RBC; that is, it comprises at least one transformer; or it may not require the isolation, like the point-of-load (POL) DC converter, the front regulate module (FRM), and the PFC circuit; that is, it comprises at least one inductor.

The transformer and inductor on the power unit can be integrated or separated.

The input of the power unit can be a direct current or an industrial-frequency alternating current, or the high-frequency alternating current illustrated in FIG. 16.

The output of the power unit can be within various voltage ranges, such as 0.1 to 12 V, or 12 V to 400 V. The load can be another power supply converter, the hard drive, the memory, the graphic processing chip, the CPU, the communication ASIC, or other data processing chips.

Moreover, the power unit, just like the control unit, may comprise a bearing plate, such as the printed circuit board or the lead frame, and the electric connection among the components of the power unit is achieved by the trace on the bearing plate, the components/elements of the power unit can also be placed on the bearing plate; or can be implemented by the embedding technique; that is, the electric element, such as the transistor and the capacitor are embedded in the bearing plate. Moreover, the power unit can also use inter-stacking elements within the unit, so that the surface conductors of the elements are used for electric connection.

When the whole circuit comprises two or more power units, it is possible to use identical power units that are in parallel connection to implement a conversion of higher power and higher current; or they can be serially connected to implement a conversion of higher power and higher voltage; alternatively, different power units that are serially connected (as illustrated in FIG. 8) are used to achieve a greater operating range; or different power units can be used, in which they share a common input to provide the power supply conversion of multiple outputs; or different power units can be so that one output can receive the power supply conversion from multiple inputs.

In view of the foregoing, the application range of the present disclosure is quite broad; it may enhance the performance of the server. Of course, the method for implementing the power converter is also suitable for use in other application settings.

Design of Stack Structure

In one aspect of the present invention, in one server, a power supply converter is divided into at least two units, i.e., at least one control unit 130 and one power unit 120, that are stacked to take full advantage of the height, thereby providing a power supply converter with high efficiency and high power pressure, so as to provide a server with better performance. The stacking of the power supply converter is as follows.

Figure 17:
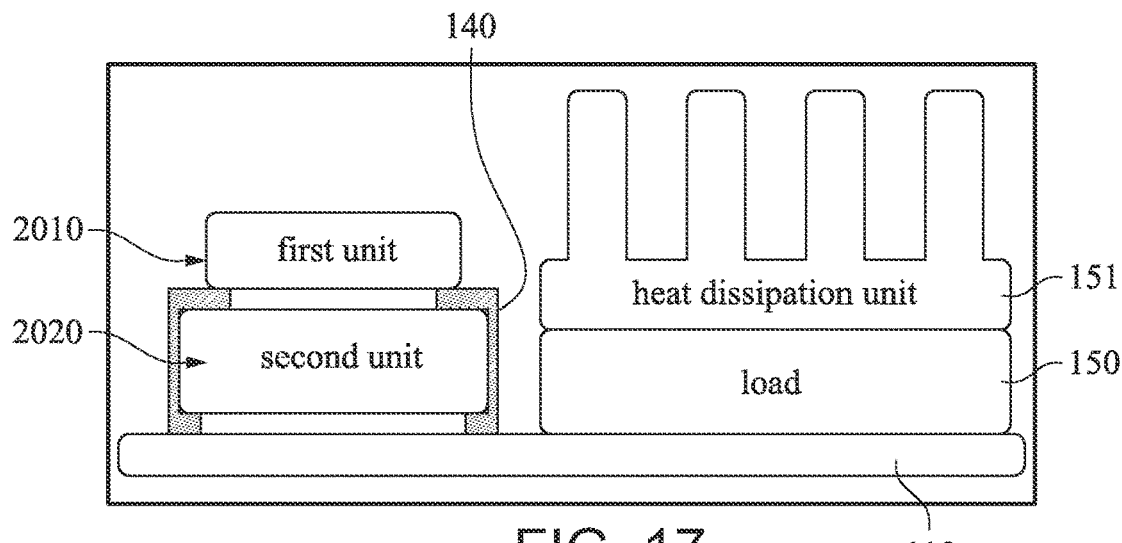
FIG. 17 to FIG. 20 illustrate the stack structure design according to embodiments of the present disclosure.
Figure 18:
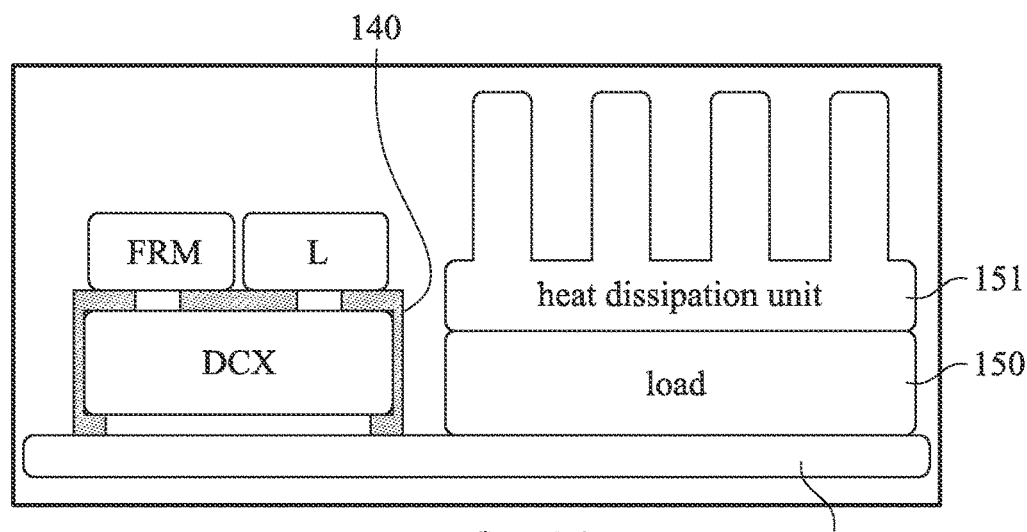

As illustrated in FIG. 17, the unit with a greater area among the control unit and the power unit is used as the first unit 2010, while the one with the smaller area is used as the second unit 2020; the first unit 2010 is disposed between the second unit 2020 and the main board 110; the area of each unit 2010, 2020 differs, and the smaller one is stacked on the bigger one to form a power supply converter which is then disposed on the main board 110. As illustrated in FIG. 18, the control unit and the power unit are integrated as an isolated transforming module DCX, and front regulate module (FRM); this is one implementation of the above-mentioned front regulate module (FRM)+isolated transforming module DCX infrastructure; however, to achieve a higher efficiency, the external inductor L of the front regulate module (FRM) is disposed outside. The front regulate module (FRM) and the external inductor L are then disposed above the isolated transforming module DCX to form a power supply converter, which is then disposed on the main board 110.

Figure 19:
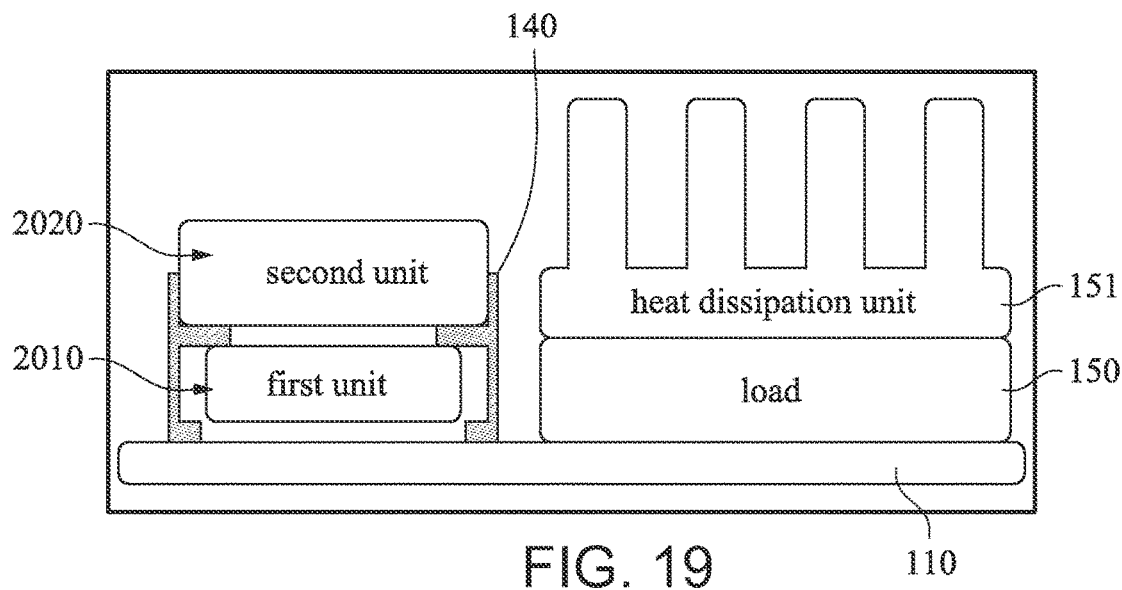

As illustrated in FIG. 19, the unit with a greater area among the control unit and the power unit is used as the first unit 2010, while the one with the smaller area is used as the second unit 2020; the second unit 2020 is disposed between the first unit 2010 and the main board 110; the area of each unit 2010, 2020 differs, and the smaller one is stacked at the lower surface of the bigger one to form a power supply converter which is then disposed on the main board 110.

Figure 20:
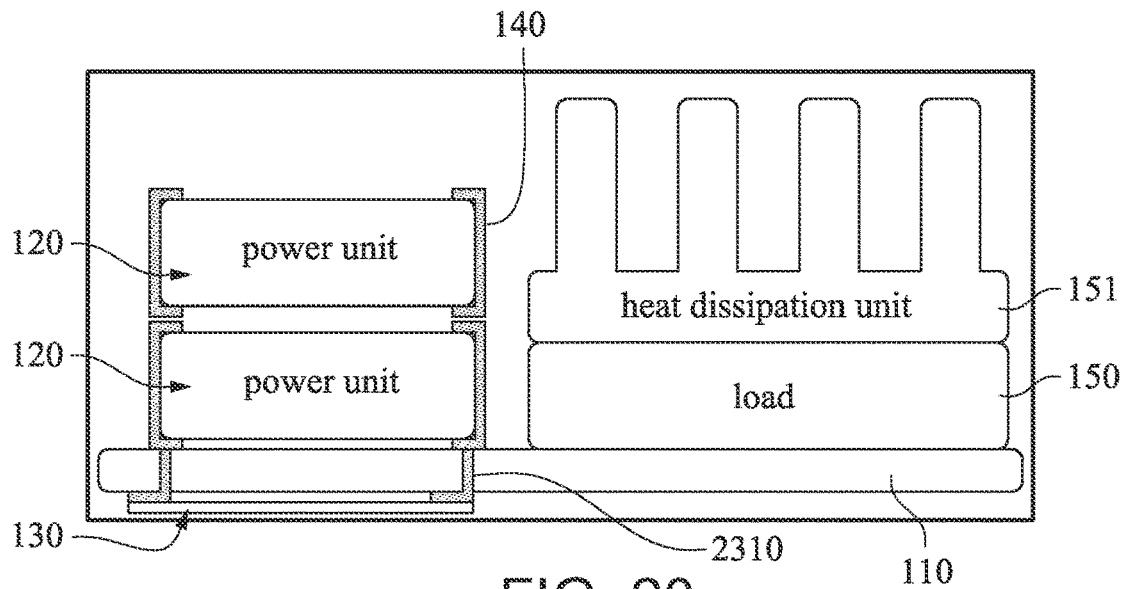

As illustrated in FIG. 20, the power unit 120 and the load are disposed at one side of the main board 110, while the control unit 130 is disposed on the main board 110 at a side that is opposite to the power unit 120; the power unit 120 and the control unit 130 are respectively disposed at the opposite surfaces of the main board 110; that is, each unit 120, 130 is respectively disposed at the upper and lower surfaces of the main board 110; the control unit 130 is electrically connected to the pins 140 via the conducting through holes 2310 of the main board 110; the overlapping part of the projection areas of the units accounts for at least one-third of the projection area of said unit. Apparently, due to the limitation of dissipation and the thickness, it is preferably that the control unit 130 is disposed at the lower surface of the main board, and the power unit 120 is disposed at the upper surface of the main board 110.

Obviously, the above-mentioned implementation means can effectively utilize the height, so as to achieve both the high efficiency and high power pressure of the power supply, to give a power supply module with better performance, especially in applications such as the server power supply.

Pads Arrangement and Implementation

Figure 21:
FIG. 21 to FIG. 25 illustrate the pin arrangement according to embodiments of the present disclosure.

A power supply converter comprises many pins. Pins involved in the connection between the converter and the system include, for example, converter power input/output pins, and pins for system communication, and pins for internal interconnection, such as the connection between the power unit and the control unit. Since the terms pins has a specific definition, here, the pins injected from the components/elements on the bearing plate is referred to as the pads. Referring to FIG. 21, the pads can be divided into two main types, the power pads and the signal pads, depending on the current level. The power pads are the pads that the converter power current passes pads, which is generally responsible for the electric connection between components/elements of the power circuit; since the current level passing them is higher, these pads are often thicker; that is, the cross-sectional area of the pad is bigger. The signal pads are the pads responsible for transmitting the signal in the converter; for example, the control circuit in the control unit often transmits the control signal to the driving circuit through the signal pads so as to control the conduction and turning-off of the power components/elements. Generally, the current level passing through control pads is lower, and hence, the pads are thinner; that is, the cross-sectional area thereof should not be too big, and the size often depends on the capability required.

When the power supply converter is an isolated circuit (the isolation is often achieved by the transformer of the power circuit); that is, the input/output thereof has the requirement of isolated safety voltage. Hence, depending on the position thereof, the pads can divided as the primary lateral group pads (i.e., the pads disposed at the primary side of the transformer) and secondary lateral group pads (i.e., the pads disposed at the secondary side of the transformer). The two groups of pads should be separated by a specific distance to meet the safety requirement; for example, when the input of the converter is 400 V, an isolation of at least 2000 V is required and hence, any pads in one group should be separated from any pads in the other groups by at least 4 to 8 mm; while when the input is 36 to 72 V, an safety isolation voltage of 1500 V is often required, and the distance is 1 to 4 mm. Regarding the primary lateral group, since the voltage of the input is relatively high, the current is smaller, and the cross-sectional area of such pads is relatively small. For the secondary lateral group, since the voltage is lower, the current is higher, and hence, the cross-sectional area of the pads is greater. For example, for the 48 V to 1 V converter, the difference of the current is 48 folds, if the same current density is used to define the volume of the pads, there would be a 48-fold difference, and it is obvious that the secondary lateral group requires more position for the disposition.

Figure 22:
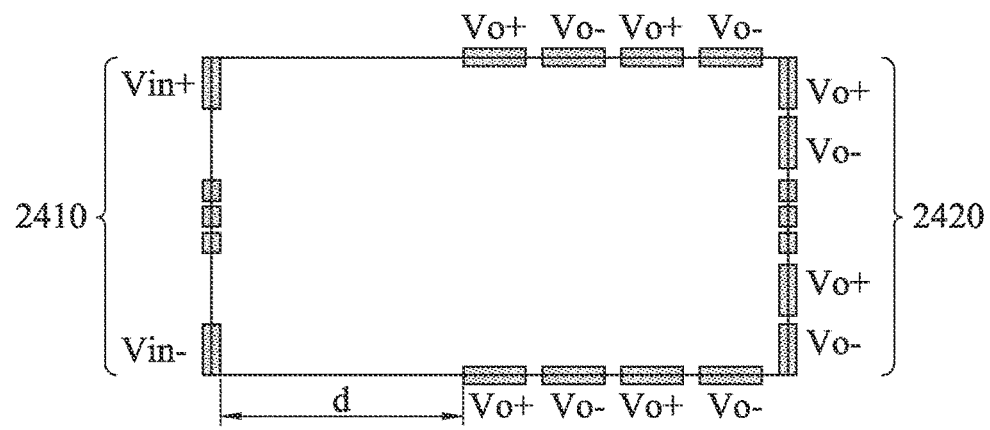

The pads can be disposed at the four sides of the power unit, as illustrated in FIG. 21 and FIG. 22. In FIG. 21, the primary lateral group pads 2410 and the secondary lateral group pads 2420 respectively occupy the two sides of the power unit, and said two sides are parallel to each other; the primary lateral group pads 2410 comprises first signal pads 2411 and first power pads 2412, the cross-sectional area of the first power pads 2412 is greater than the cross-sectional area of the first signal pads 2411; the secondary lateral group pads 2420 comprises second signal pads 2421 and second power pads 2422, the cross-sectional area of the second power pads 2422 is greater than the cross-sectional area of the second signal pads 2421, the number of the second power pads 2422 is greater than the number of the first power pads 2412. The arrangement in FIG. 21 is suitable for applications with lower output current. FIG. 22, on the other hand, is suitable for use in application with higher current output; the primary lateral group pads 2410 are distributed along one side of the unit, and the secondary lateral group pads 2420 are distributed along the remaining three sides of the unit, and are spaced from the primary lateral group pads 2410 by a safety distance d. When the current is higher, a single pad has a great electrical characteristics; when multiple pads are required, i.e. multiplex pads, they can be arranged in alternating positive and negative electrodes, such as, Vo+, Vo−, so that the induction resistance of the pads is as low as possible; in this way, when applied in loads like CPU, there is a better dynamic response and reduce the utilization rate of the capacitor of the main board.

Figure 23:
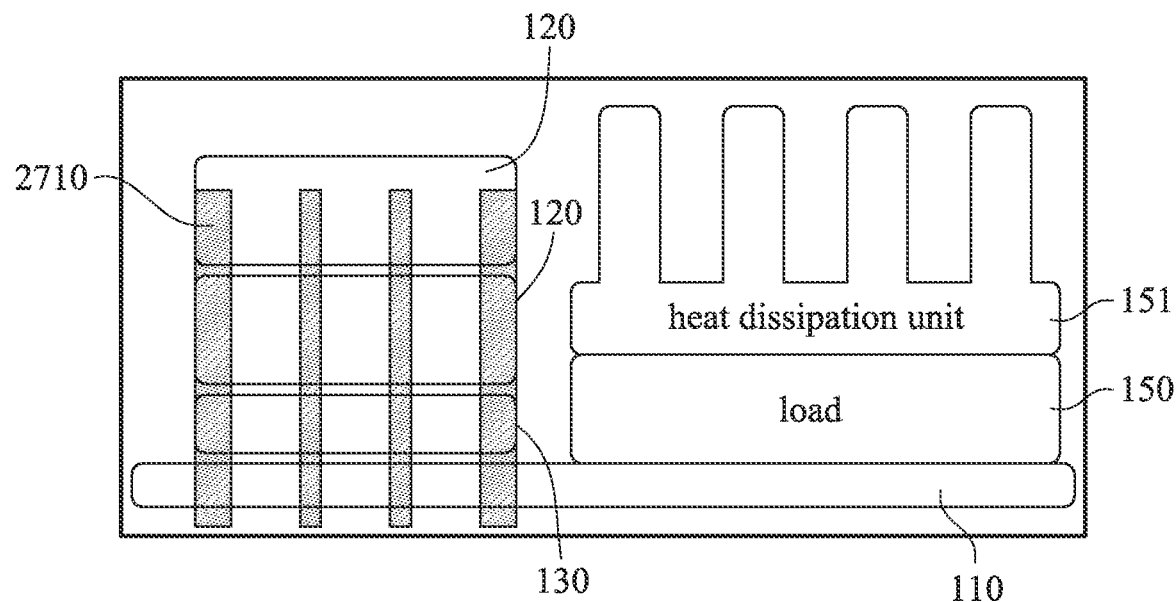
Figure 24:
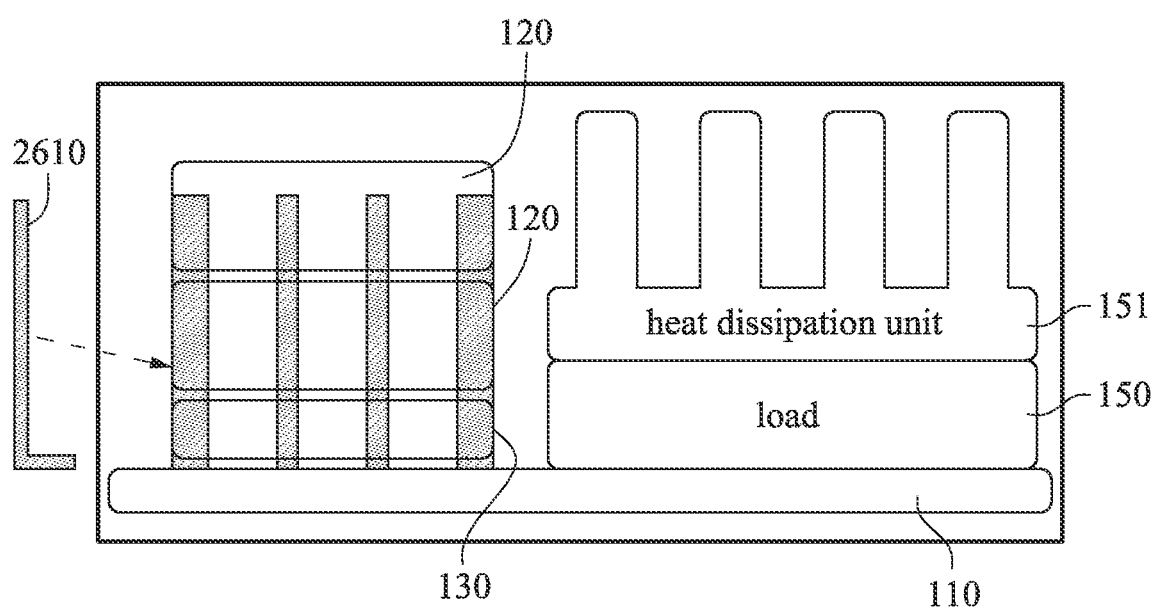

In the present application, the pins are electrically coupled with the pads. FIG. 24 is a front view illustrating the connection of the pins and pads for implementing the interconnection of each unit. In FIG. 24, the exemplified pins are surface-mount pins. The L-shaped surface-mount pins 2610 electrically connects each unit 120, 130 to form a power supply converter with the surface-mount pins, which is then disposed on the main board 110. After changing the pins to the I-shaped pins, the power supply converter with the I-shaped in-line pins 2710 (as illustrated in FIG. 23) is formed.

FIG. 25

Before the assembly of the pins 140, each unit 120, 130 can be encapsulated with the packaging technique such as molding or embedding to for a regular surface, such as the recess 3410 illustrated in FIG. 25; since the insulation material 3430 has the recess 3410 disposed thereon for fitting the installation of the pins 140, it is more advantageous to the delicate utilization of the space, and then the surface-mount pins are installed thereon. Specifically, any one of the control unit and the power unit comprises a bearing plate 3420 and insulation material 3430; the insulation material 3430 is formed on the two opposite surfaces of the bearing plate 3420 the lateral side of the bearing plate 3420 is disposed with the pads 3440; the soldering material 3450 on the pads 3440 is soldered to the pins 140. At the edge of the upper and lower surface of the insulation material 3430, there is a recess 3410; the two terminals of each pin 140 has the SMD pad 2910 extending to the recess 3410 at the upper and lower surfaces, the recess 3410 has the bonding material 3460 disposed thereon for bonding with the SMD pads 2910.

The unit illustrated in FIG. 25 can be any of the above-mentioned power unit and/or control unit; the pads 3440 are distributed along the lateral side of the power unit and the lateral side of the control unit; the pins 140 and pads 3440 are electrically coupled. The pins 140 are surface-mount pins, and are distributed along the outer surface of the power unit and control unit, and are electrically coupled to the pads 3440. The pads 3440' are further distributed along a side of the power unit that is perpendicular to the side at which the and pads 3440 are disposed; although in FIG. 25, the pads 3440' are only distributed along the lower surface; the present invention is not limited thereto; in one embodiment, pads are distributed along the lateral side of the power unit 120 and the upper and lower surfaces of the control unit 130, and the pins 140 and pads 3440 are electrically coupled.

The surface-mount pins can be installed on each surface of the unit, but in order to achieve a better dissipation effect and to further reduce the overall size of the module, in the above examples, the pads are disposed at the lateral side of the bearing plate in each unit, and the surface-mount pins are soldered to connect with in injected pins of the components of the unit and the control signal injected pins. However, under certain special circumstances, as illustrated in FIGS. 18 and 19, the pads in the first unit 2010 can also be disposed at the stacking surface of the second unit 2020 and the inductor L, and the pins are used to implement the typical connection between the first unit 2010 and the second unit 2020 and the inductor L. The contact surface other than the solder points of the pins and pads can be applied with glues or the like, so that the pins are bonded to the surface of each unit, thereby increasing the mechanical strength and the reliability.

Heat Dissipation

After stacking each unit to form a module, the heat dissipation pathway is altered, as compared with the conventional design in which the units are individually disposed.

Figure 26:
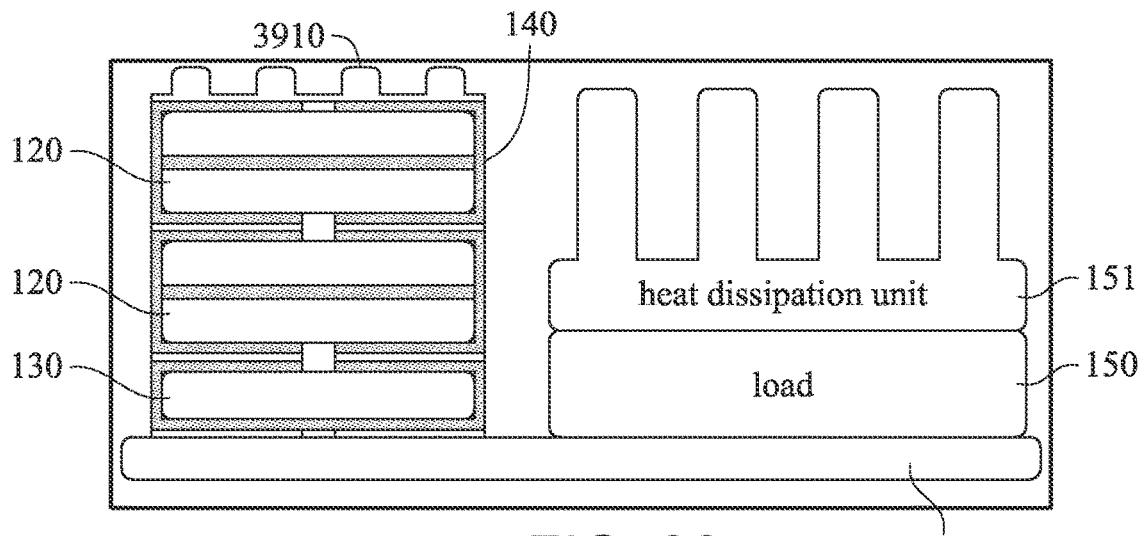
FIG. 26 illustrates the infrastructure for heat dissipation according to embodiments of the present disclosure.

FIG. 26 illustrates the installation of the heat dissipation unit. As illustrated in FIG. 26, the electrically-isolated heat dissipation unit 3910 is disposed on the power unit 120; the power unit 120 is disposed on the control unit 130; the control unit 130 is disposed on the main board 110; or, as illustrated in FIG. 26, the electrically-isolated heat dissipation unit 4010 is disposed on the lateral sides of the power unit 120 and the control unit 130. It can be disposed at the upper surface or the lateral side of the assembled module. To avoid affecting the electric characteristics of the module, the heat dissipation unit can be an electric insulation material, such as the ceramic. Alternatively, when the heat dissipation unit is a conducting material such as aluminum, copper, graphite, etc., thereby should be a thermal-conducting and electrical-insulation material (such as the ceramic sheet or the like) between the heat dissipation unit and the pins. The heat dissipation units are all disposed above the pad or pin assembly. To ensure the heat dissipation effect, the thermal resistance between the heat dissipation unit and the pad or pin assembly should be less than 5° C./Watt. There is an insulation material between the heat dissipation unit and the pad or pin assembly.

Other Optimized Embodiments

According to the above-mentioned example, it is feasible to achieve a greater power by stacking multiple power units. Generally, these power units use the magnetic elements with the similar using/operating condition, such as a transformer or an inductor.

Figure 27:
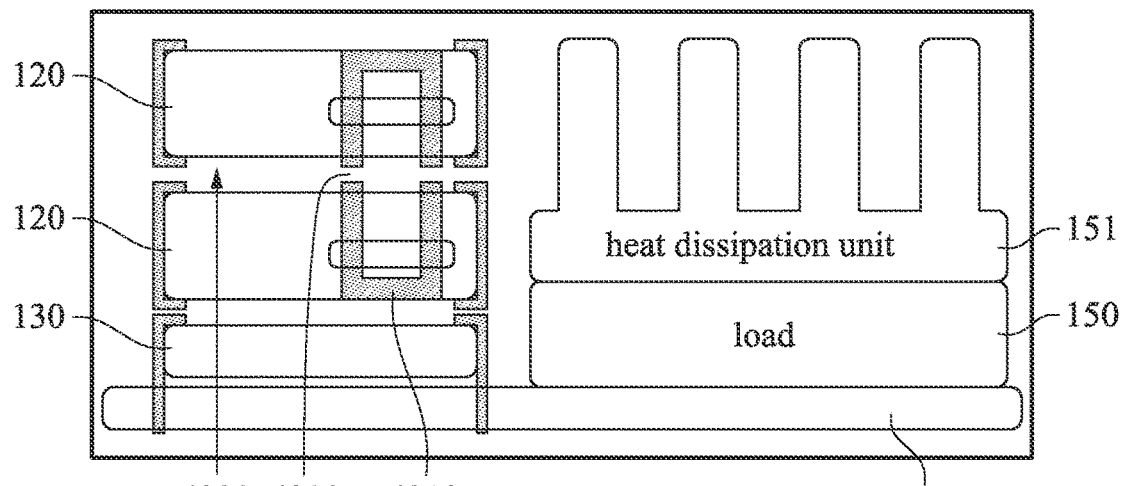
FIG. 27 illustrates the arrangement of the magnetic core according to embodiments of the present disclosure.

As illustrated in FIG. 27, since the magnetic element often has an air space 4320, and the conductor nearby is often inducted and heated by the magnetic flux leaked from the air space 4320, thereby causing loss. By sharing the magnetic core 4310 through stacking, the air space 4320 of the magnetic core 4310 can be disposed at the stacking space 4330 between the power units 120, thereby keeping the air space from the conductor so as to reduce the loss.

Figure 28A:
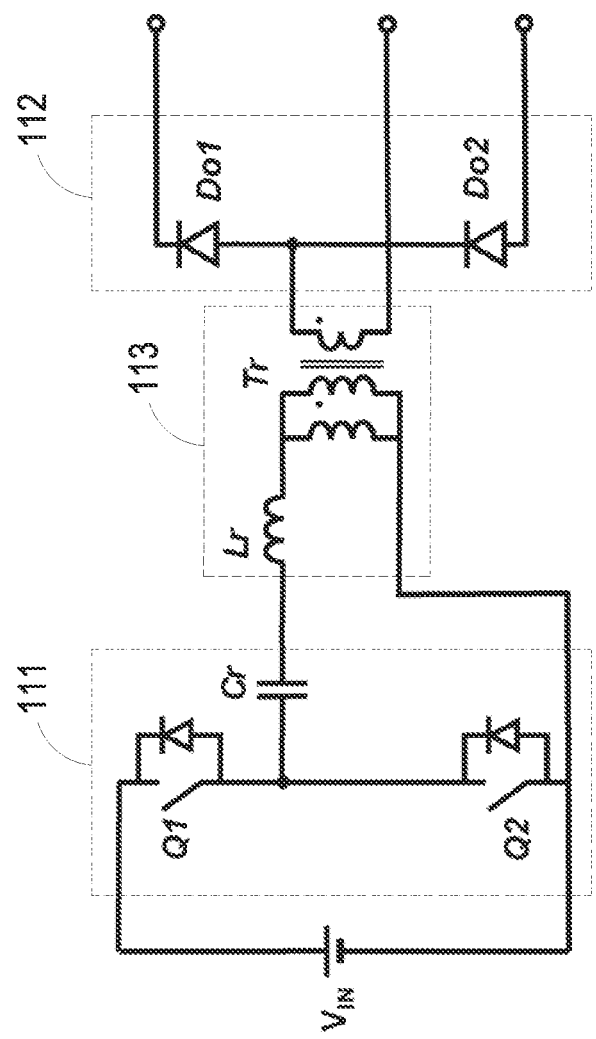
FIG. 28A shows a single phase LLC circuit.

FIG. 28A shows a single phase LLC circuit. In FIG. 28A, an input voltage YIN has a positive terminal and a negative terminal. A first half bridge circuit includes two switches Q1 and Q2 connected in series, wherein the first half bridge circuit is connected in parallel with YIN. A resonant circuit which is connected between the middle point of the half bridge circuit and the negative terminal of the input voltage includes a resonant inductor Lr, a resonant capacitor Cr and a transformer Tr. The secondary side of the transformer Tr is connected to two diodes Do1, Do2.

And the single phase LLC circuit has three parts, 111, 112 and 113. As an example, part 113 may include the resonant inductor Lr and the transformer Tr; part 111 may include the rest components at the primary side of Tr, such as the serial-connected switches Q1 and Q2, the resonant capacitor Cr; and part 112 may include the components at the secondary side of Tr, such as Do1 and Do2, or even the output capacitor Co (not shown in FIG. 28A).

Figure 28B:
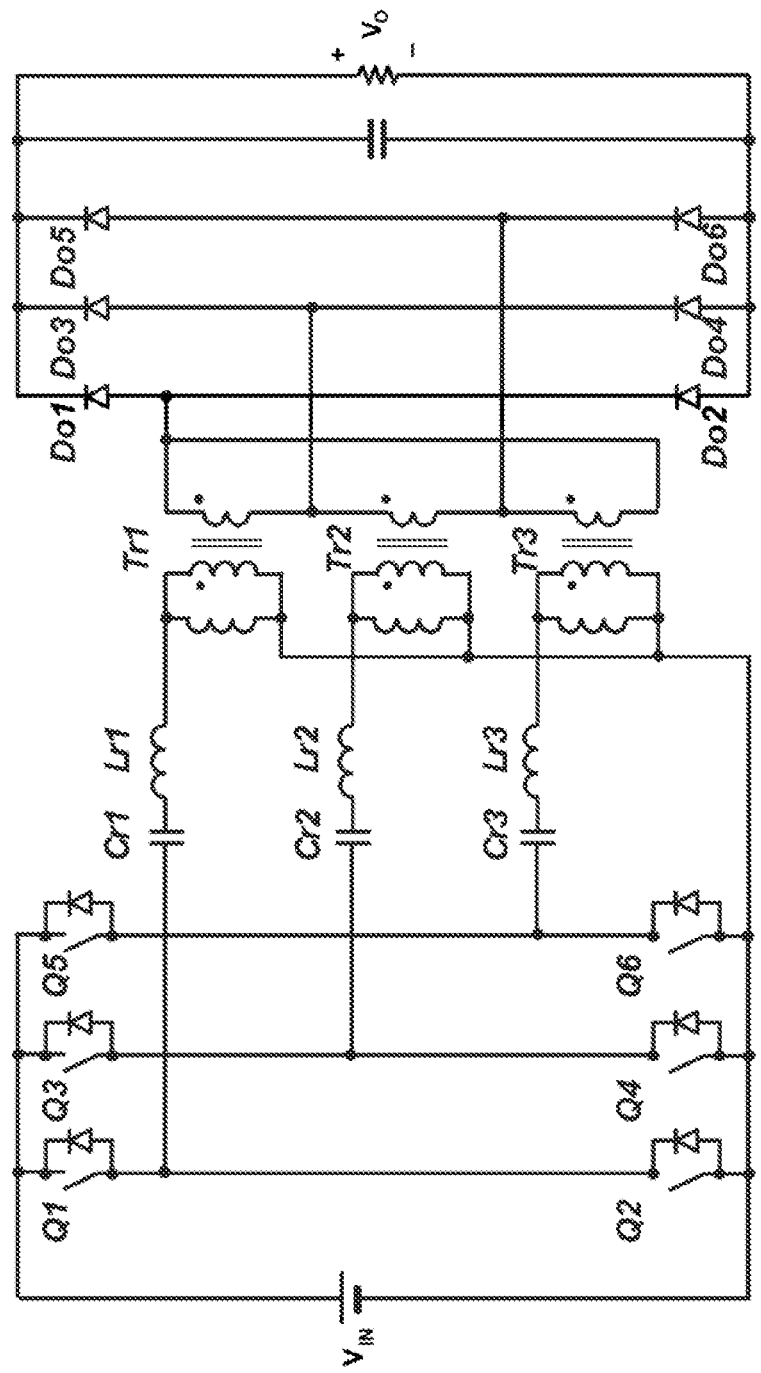
FIG. 28B shows a 3-phase LLC topology.

FIG. 28B shows a 3-phase LLC topology, which includes three single phase LLC circuit shown in FIG. 28A. In FIG.

28B, there are a first half bridge circuit, a second half bridge circuit and a third half bridge circuit, which are connected in parallel. The first half bridge circuit is identical to that in FIG. 28A, which includes two serial-connected switches Q1 and Q2. The second half bridge circuit includes two switches Q3 and Q4 connected in series. The third half bridge circuit includes two switches Q5 and Q6 connected in series. And there are three resonant circuits. A first resonant inductor Lr1, a first resonant capacitor Cr1 and a first transformer Tr1 form a first resonant circuit. A second resonant inductor Lr2, a second resonant capacitor Cr2 and a second transformer Tr2 form a second resonant circuit. A third resonant inductor Lr3, a third resonant capacitor Cr3 and a third transformer Tr3 form the third resonant circuit. One terminal of the three resonant circuits is connected to the negative terminal of the input voltage together, the other terminals of the three resonant circuits are connected to the corresponding middle point of the half bridge circuits respectively. The primary windings of the three transformers Tr1, Tr2 and Tr3 are connected in a Y-type while the secondary windings of the three transformer are connected in a Δ-type in FIG. 28B. The primary windings may connect in a Δ-type, and the secondary windings may connect in a Y-type. Furthermore, the three resonant inductors Lr1, Lr2 and Lr3 may be coupled.

Figure 28C:
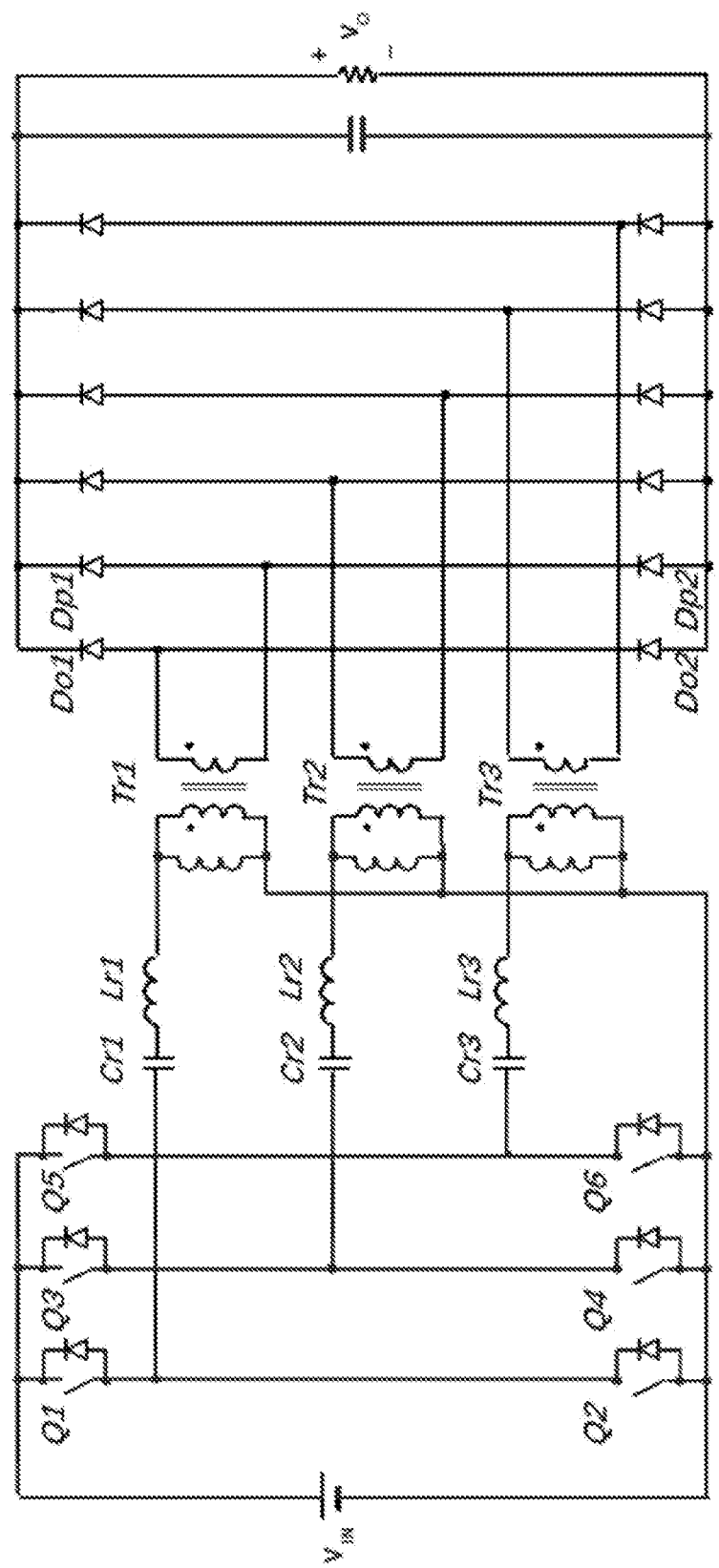
FIG. 28C shows another 3-phase LLC topology

FIG. 28C shows another 3-phase LLC topology. Comparing with the topology in FIG. 28B, the difference is that each of the three half bridge circuits in the secondary side of the transformers in FIG. 28B is replaced by a full bridge circuit. For example, in FIG. 28C, Do1 and Do2 connected in series form a bridge. Dp1 and Dp2 connected in series form the other bridge. These two bridges connected in parallel form a full bridge circuit. And two terminals of the secondary side of the transformer Tr1 are connected to the middle points of this full bridge circuit.

Figure 28D:
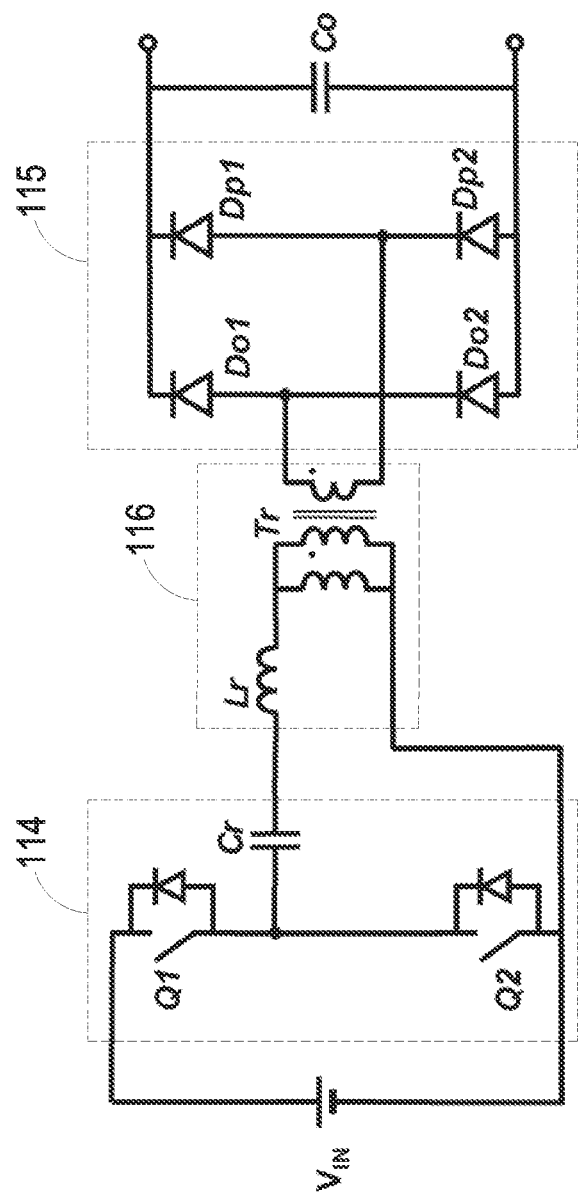
FIG. 28D shows another single phase LLC circuit

FIG. 28D shows another single phase LLC circuit. Comparing the circuit shown in FIG. 28A, the circuit in the secondary side of Tr is changed into a full bridge circuit. Do1 and Do2 connected in series form a half bridge; Dp1 and Dp2 connected in series form another half bridge. And these two half bridges connected in parallel form a full bridge circuit. In FIG. 28D, the circuit also has at least three parts, 114, 115 and 116. As an example, part 116 may include the resonant inductor Lr and the transformer Tr; part 114 may include the rest components in the primary side of Tr, such as the serial-connected switches Q1 and Q2, the resonant capacitor Cr; and part 115 may include the full bridge circuit in the secondary side of Tr, such as Do1, Do2, Dp1 and Dp2, or even the output capacitor Co.

Figure 29:
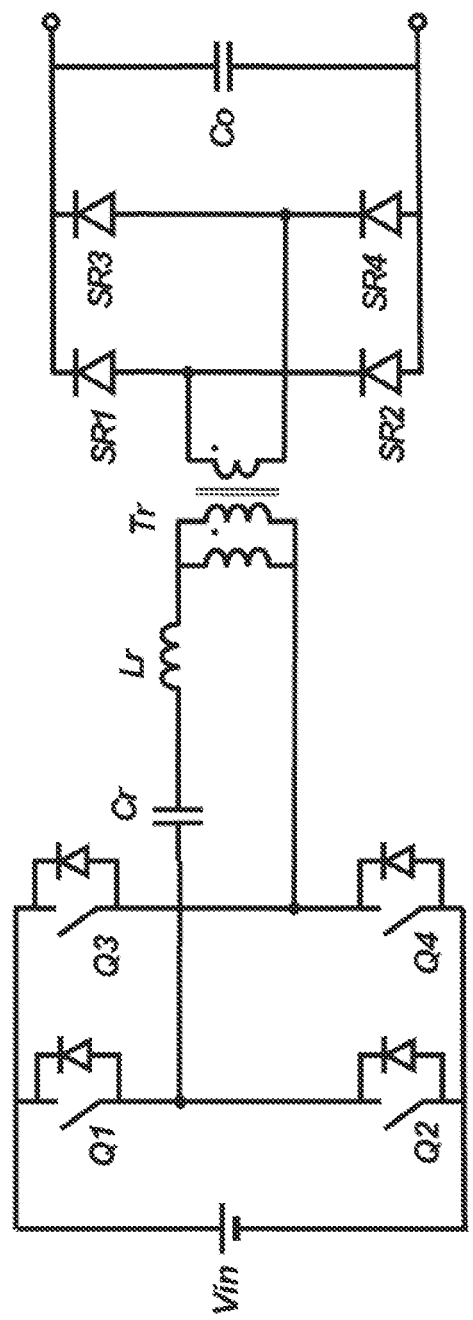
FIG. 29 shows an H bridge LLC topology.

FIG. 29 shows an H bridge LLC topology. This topology has a first half bridge, a second half bridge, a third half bridge and a fourth half bridge. The first half bridge and the second half bridge are identical to those in FIG. 28B, wherein the first half bridge comprises two serial connected switches Q1 and Q2 and the second half bridge comprises two serial connected switches Q3 and Q4. Switches SR1 and SR2 connected in series form a fourth half bridge. Switches SR3 and SR4 connected in series form a fourth half bridge. The resonant circuit which connects between the mid-points of the first and the second half bridges includes the resonant inductor Lr and the resonant capacitor Cr. The secondary winding of the transformer Tr connects between the mid-points of the third and the fourth half bridges.

Figure 30A:
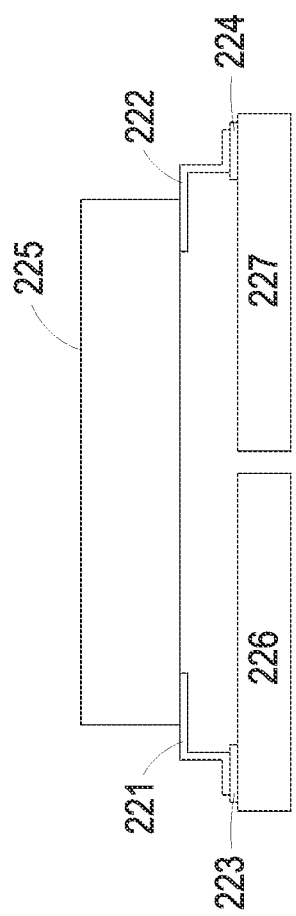
FIGS. 30A-30C shows a stacked structure of three units.
Figure 30B:
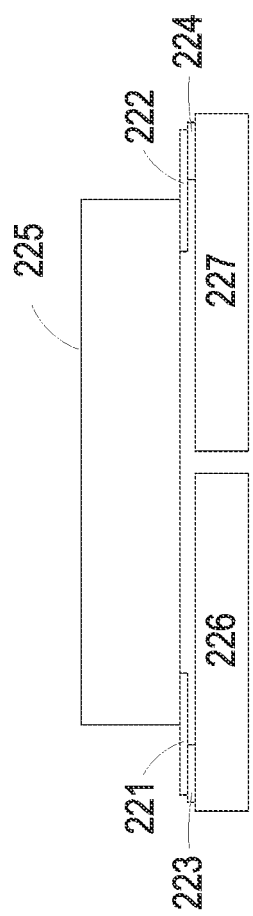
Figure 30C:
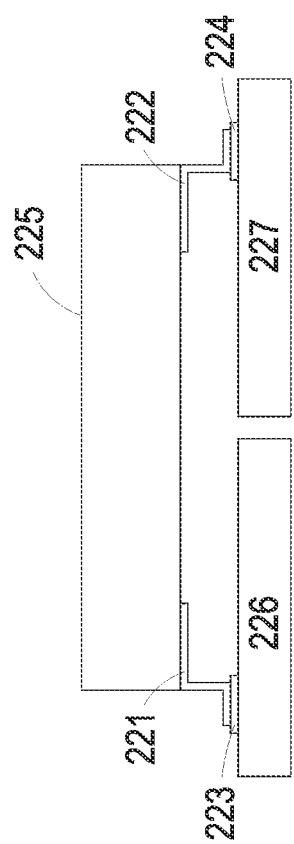

FIGS. 30A-30C shows a stacked structure of three units, wherein a magnetic unit is stacked above two power units. As an example, these three units may correspond to the circuit in FIG. 28A. The first power unit 226 in FIGS. 30A-30C may include the components in the part 111 of FIG. 28A. The second power unit 227 may include the components in the part 112 in FIG. 28A. And the magnetic unit 225 placed above the first power unit and the second power unit may include the components in the part 113 in FIG. 28A, —that is, the resonant inductor Lr and the transformer Tr, thus the magnetic unit comprises magnetic core and windings, wherein the windings are not shown clearly in the figure. And the resonant inductor and the transformer may be integrated, so the windings of the resonant inductor and the transformer may wind on a same magnetic core.

The magnetic unit 225 has at least two pins 221 and 222, wherein the pin 221 is connected to the power unit 1 and the pin 222 is connected to the power unit 2.

As shown in FIG. 30A, pins 221 and 222 are connected to the power unit 1 and 2 respectively through pads 223 and 224.

Pins 221 and 222 may be a flat metal in FIG. 30B, or a metal with bending structure shown in FIG. 30A and FIG. 30C. Whatever, pins 221 and 222 extend out of the sides of the magnetic core. That is to say, at least part of the pins is outside the projection of the magnetic core in the connection plane of the power units and the magnetic unit. The purpose is to achieve mechanical connection between the extending-out part of the pins and the pads 223 and 224 by local processing technologies instead of the traditional overall reflow soldering technology, as the magnetic unit has a big thermal capacitor which is not suitable for overall reflow soldering process. The local processing technologies include ultrasonic welding, pressure sintering, laser welding, ion-soldering etc., which are apply on the extending-out part of the pins only.

And the pins 221 and 222 may be integrated with the windings of the transformer or inductor. Or the pins 221 and 222 may be independent parts.

As another example, the stack three units in FIG. 30A-30C may correspond to the circuit in FIG. 28D. The first power unit 226 in FIG. 30A-30C may include the components in the part 114 of FIG. 28D. The second power unit 227 may include the components in the part 115 in FIG. 28D. And the magnetic unit 225 placed above the first power unit and the second power unit may include the components in the part 116 in FIG. 28D, —that is, the resonant inductor Lr and the transformer Tr, thus the magnetic unit comprises magnetic core and windings, wherein the windings are not shown clearly in the figure. And the resonant inductor and the transformer may be integrated, so the windings of the resonant inductor and the transformer may wind on a same magnetic core.

Figure 31:
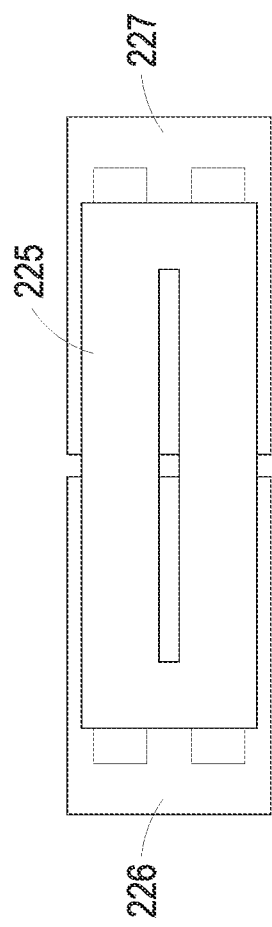
FIG. 31 shows a top view of the structure in FIGS. 30A-30C.

FIG. 31 shows a top view of the structure in FIGS. 30A-30C, wherein the magnetic unit 225 has four pins with two pins connected to the first power unit 226 on the left side and two pins connected to the second power unit 227 on the right side. This structure corresponds to the single phase LLC circuit in FIG. 28A.

Figure 32:
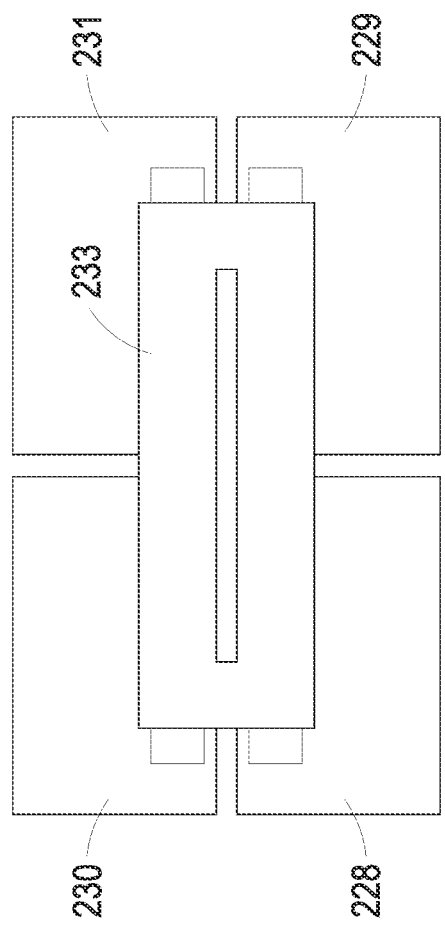
FIG. 32 shows a top view of the stacked structure referring to the circuit in FIG. 29.

FIG. 32 shows a top view of the stacked structure referring to the circuit in FIG. 29. In this structure, the magnetic unit 233 is stacked above the first power unit 228, the second power unit 229, the third power unit 230 and the fourth power unit 231. The magnetic unit 233 has at least four pins with each one connected to one corresponding power unit. In FIG. 32, the first power unit 228 may include the first half bridge circuit, and the second power unit 229 may include the second half bridge circuit and the resonant capacitor Cr. The third power unit 230 may include the third half bridge circuit and the output capacitor Co, while the fourth power unit 231 may include the fourth half bridge circuit. The magnetic unit 233 may include the resonant inductor Lr and the transformer Tr. And this stack structure may have the same front view as shown in FIGS. 30A-30C.

Figure 33:
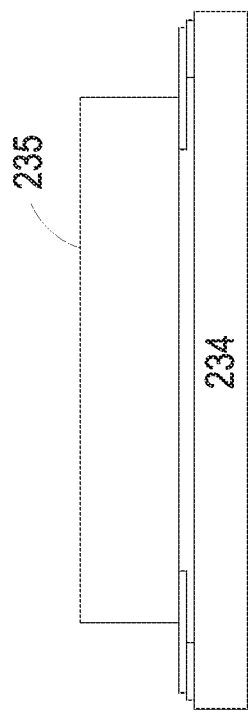
FIG. 33 shows another stacked structure.

FIG. 33 shows another stacked structure wherein all the pins of the magnetic unit 235 are connected to one power unit 234. Taking the topology in FIG. 28A as an example, the components in part 111 and 112 are all placed in the power unit 234, while the magnetic components such as the transformer Tr and the resonant inductors Lr may be integrated in the magnetic unit 235.

Figure 34:
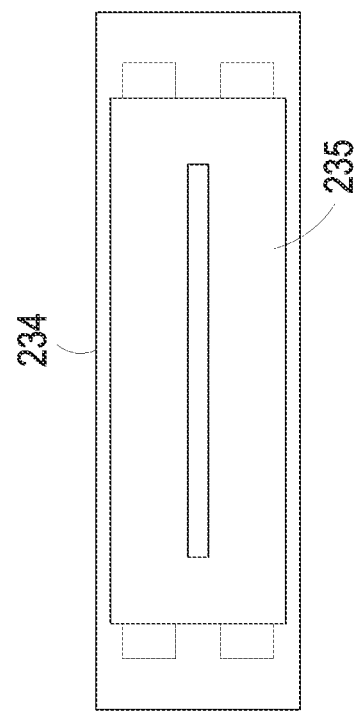
FIG. 34 shows a top view of the structure in FIG. 33.

FIG. 34 shows a top view of the structure in FIG. 33, wherein the magnetic unit 235 has at least four pins connected to the power unit 234. The structure is related to the circuit in FIG. 28A.

Figure 35:
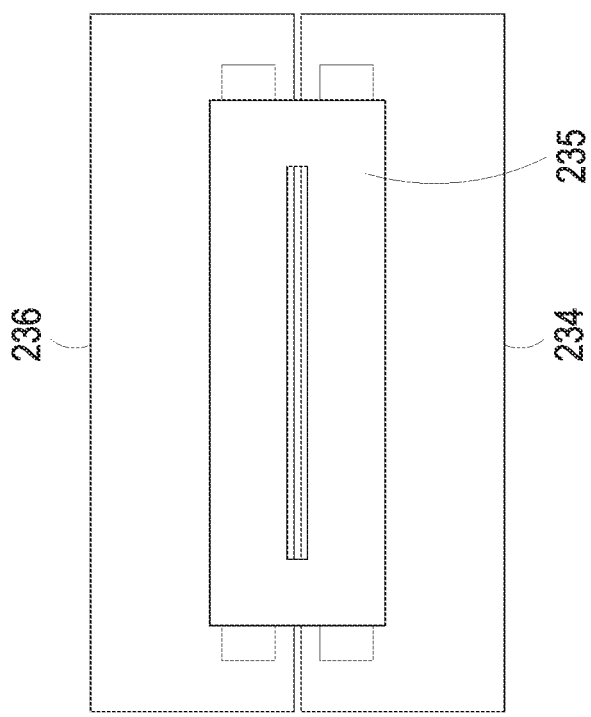
FIG. 35 shows the top view of another stacked structure, wherein this structure may have the same front view shown in FIG. 33.

FIG. 35 shows the top view of another stacked structure, wherein this structure may have the same front view shown in FIG. 33. The magnetic unit 235 is stacked above the first power unit 234 and the second power unit 235. And the power unit 234 is placed in the front and the power unit 235 is placed backwards. Taking the topology in FIG. 29 as an example, power unit 234 may include the first and second half bridges at primary side of Tr, and power unit 235 may include the third and fourth half bridges at the secondary side of Tr. The magnetic unit may include the resonant inductor Lr and the transformer Tr.

Figure 36:
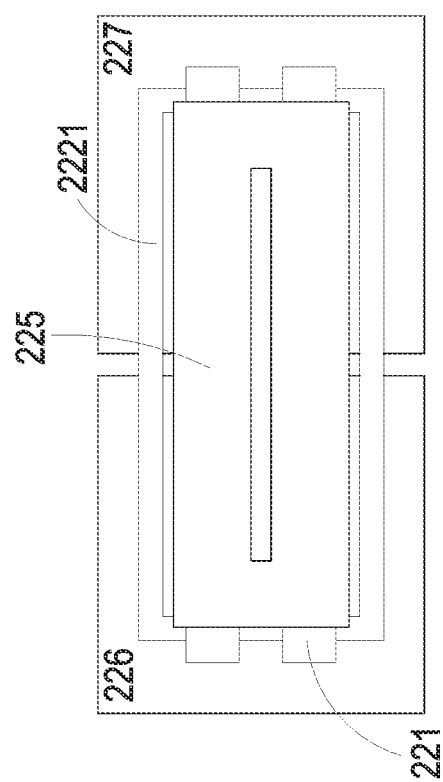
FIG. 36 shows another stack structure.
Figure 37:
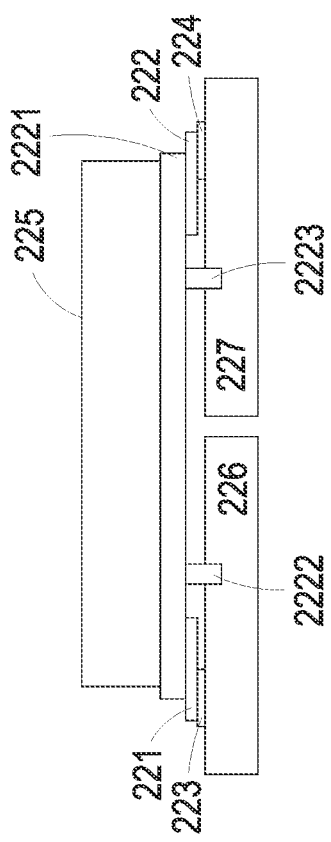
FIG. 37 is the front view of the structure in FIG. 36.

FIG. 36 shows another stack structure. Comparing with FIG. 31, a support structure 2221 of the magnetic unit 225 onto the first power unit 226 and the second power unit 227. The support structure 2221 can hold the magnetic unit and the metal pins. A part of windings comes from the top surface to the bottom surface of magnetic unit, which connects to the metal pins 221 by going through the support structure. Therefore, the metal pins are fixed by the support structure to achieve a flat structure. The support structure has a quadrilateral shape, which is larger than the magnetic unit. The support structure is made of insulation materials, such as plastic, resin, rubber etc. FIG. 37 is the front view of the structure in FIG. 36, which shows the assembly of magnetic unit 225 and power units 226, 227 with the support structure 2221. In FIG. 37, there are at least two projections 2222, 2223, which penetrate power unit 226 and power unit 227 respectively, to achieve the mechanical connection and mounting between the magnetic unit and the power units.

According to the above-mentioned embodiments, the power unit and the control unit are vertically stacked to form a power supply module. In fact, if the power supply is rotated by 90 degrees so that the power unit and the control unit are stacked horizontally, and are interconnected with each other and are respectively connected with the main board through the pins, this structure also has desirable applicability. Therefore, according to embodiments of the present disclosure, the power unit and the control unit can not only stack above each other, but also stack to the left or right of each other in the horizontal direction.

In view of the foregoing, using the Quasi-Cascade components, optimized driving, optimized application and optimized packaging disclosed herein, it is possible to increase the power density or efficiency of the power supply converter, thereby achieving a better electric performance, higher frequency performance and greater reliability, as compared with conventional technology. In this way, the characteristics of the components can be fully utilized, and it is more convenient to use the apparatus with the present packaging solution; therefore, the present disclosure facilitate the improvement of the power density or efficiency. The specific driving, application and packaging means provided by the present disclosure are quite feasible and effective. The present invention is suitable for improving the overall performance and the cost/performance ratio of the power supply converter.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supply apparatus, comprising:
    at least one power unit; and
    a magnetic unit, stacked with and electrically connected to the at least one power unit, wherein the magnetic unit comprises a plurality of pins and a magnetic core, wherein at least part of the plurality of pins extends out of a projection of the magnetic core on a connection plane of the at least one power unit and the magnetic unit to connect to the at least one power unit.

2. The power supply apparatus of claim 1, wherein the plurality of pins are between magnetic unit and the at least one power unit.

3. The power supply apparatus of claim 1, wherein the magnetic unit comprises at least one transformer having a primary side and a secondary side.

4. The power supply apparatus of claim 3, wherein the magnetic unit further comprises at least one resonant inductor.

5. The power supply apparatus of claim 4, wherein the magnetic unit comprises a magnetic core and at least two windings, and the at least two windings are wound on the magnetic core to form the at least one transformer and the at least one resonant inductor.

6. The power supply apparatus of claim 3, wherein the at least one power unit comprises at least one primary half bridge circuit and a resonant capacitor connected to the primary side, wherein each one of the at least one primary half bridge circuit comprises at least two switches connected in series.

7. The power supply apparatus of claim 6, wherein the at least one power unit further comprises at least one secondary half bridge circuit connected to the secondary side, wherein each one of the at least one secondary half bridge circuit comprises at least two switches connected in series.

8. The power supply apparatus of claim 7, wherein the at least two switches of the at least one secondary half bridge circuit are diodes.

9. The power supply apparatus of claim 1, wherein the at least one power unit comprises a plurality of pads, and the at least part of the plurality of pins is connected to the at least one power unit through the plurality of pads.

10. The power supply apparatus of claim 1, wherein each of the plurality of pins is a flat metal or a metal with a bending structure.

11. The power supply apparatus of claim 1, wherein the plurality of pins comprises a first pin, a second pin and a third pin.

12. The power supply apparatus of claim 11, wherein the at least one power unit comprises a first power unit and a second power unit, the first pin and the second pin are connected to the first power unit, and the third pin is connected to the second power unit.

13. The power supply apparatus of claim 12, wherein the first pin and the second pin are both disposed at a first side of the magnetic unit.

14. The power supply apparatus of claim 12, wherein the first pin is disposed at a first side of the magnetic unit, and the second pin is disposed at second side of the magnetic unit, wherein the first side and the second side are opposite sides of the magnetic unit.

15. The power supply apparatus of claim 12, wherein the plurality of pins further comprises a fourth pin and the fourth pin is connected to the second power unit.

16. The power supply apparatus of claim 11, wherein the at least one power unit comprises a first power unit, a second power unit and a third power unit, the first pin, the second pin, and the third pin are connected to the first power unit, the second power unit and the third power unit, respectively.

17. The power supply apparatus of claim 16, wherein the at least one power unit further comprises a fourth power unit, the plurality of pins further comprises a fourth pin, and the fourth pin is connected to the fourth power unit.

18. The power supply apparatus of claim 11, wherein the at least one power unit comprises a first power unit, the first pin, the second pin, and the third pin are connected to the first power unit.

19. The power supply apparatus of claim 18, wherein the at least one power unit further comprises a fourth pin, and the fourth pin is connected to the first power unit.

20. The power supply apparatus of claim 11, wherein the first pin and the second pin are disposed at a first side of the magnetic unit, and the third pin is disposed at second side of the magnetic unit, wherein the first side and the second side are opposite sides of the magnetic unit.

21. The power supply apparatus of claim 20, wherein the at least one power unit further comprises a fourth pin, and the fourth pin is disposed at the second side of the magnetic unit.

22. The power supply apparatus of claim 1, wherein the magnetic unit further comprises a support structure stacked between the magnetic unit and the at least one power unit.

23. The power supply apparatus of claim 22, wherein the support structure is made of an insulation material.

24. The power supply apparatus of claim 22, wherein a projection of the support structure in the connection plane of the at least one power unit and the magnetic unit is larger than a projection of the magnetic unit in the connection plane of the at least one power unit and the magnetic unit.

25. The power supply apparatus of claim 22, wherein the support structure comprises at least one column, and each one of the at least one column penetrates one of the at least one power unit corresponding thereto.

* * * * *